United States Patent
Sutivong et al.

(10) Patent No.: US 8,452,316 B2
(45) Date of Patent: May 28, 2013

(54) POWER CONTROL FOR A WIRELESS COMMUNICATION SYSTEM UTILIZING ORTHOGONAL MULTIPLEXING

(75) Inventors: Arak Sutivong, San Diego, CA (US); David Jonathan Julian, San Diego, CA (US); Avneesh Agrawal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1524 days.

(21) Appl. No.: 10/897,463

(22) Filed: Jul. 22, 2004

(65) Prior Publication Data

US 2006/0019694 A1 Jan. 26, 2006

Related U.S. Application Data

(60) Provisional application No. 60/580,819, filed on Jun. 18, 2004.

(51) Int. Cl.
*H04M 1/00* (2006.01)

(52) U.S. Cl.
USPC .............................. 455/522; 455/69; 370/334

(58) Field of Classification Search
USPC ..................................... 455/552, 69; 370/334
See application file for complete search history.

(56) References Cited

U.S. PATENT DOCUMENTS

| | | | |
|---|---|---|---|
| 3,577,080 | A | 5/1971 | Cannalte |
| 4,225,976 | A | 9/1980 | Osborne et al. |
| 4,539,684 | A | 9/1985 | Kloker |
| 4,638,479 | A | 1/1987 | Alexis |
| 4,901,307 | A | 2/1990 | Gilhousen et al. |
| 4,908,827 | A | 3/1990 | Gates |
| 5,103,459 | A | 4/1992 | Gilhousen et al. |
| 5,267,262 | A | 11/1993 | Wheatley, III |
| 5,301,364 | A | 4/1994 | Arens et al. |

(Continued)

FOREIGN PATENT DOCUMENTS

| | | |
|---|---|---|
| CA | 2340201 | 4/2006 |
| CA | 2635291 A1 | 10/2007 |

(Continued)

OTHER PUBLICATIONS

International Search Report—PCT/US05/020086, International Search Authority—European Patent Office, Oct. 4, 2005.

(Continued)

*Primary Examiner* — Nay A Maung
*Assistant Examiner* — Angelica M Perez
(74) *Attorney, Agent, or Firm* — Donald C. Kordich

(57) ABSTRACT

Techniques for adjusting transmit power to mitigate both intra-sector interference to a serving base station and inter-sector interference to neighbor base stations are described. The amount of inter-sector interference that a terminal may cause may be roughly estimated based on the total interference observed by each neighbor base station, channel gains for the serving and neighbor base stations, and the current transmit power level. The transmit power may be decreased if high interference is observed by a neighbor base station and increased otherwise. The transmit power may be adjusted by a larger amount and/or more frequently if the terminal is located closer to the neighbor base station observing high interference and/or if the current transmit power level is higher, and vice versa. The intra-sector interference is maintained within an acceptable level by limiting a received SNR for the terminal to be within a range of allowable SNRs.

47 Claims, 7 Drawing Sheets

U.S. PATENT DOCUMENTS

| | | | |
|---|---|---|---|
| 5,396,516 A | 3/1995 | Padovani et al. | |
| 5,406,613 A | 4/1995 | Peponides et al. | |
| 5,448,600 A | 9/1995 | Lucas | |
| 5,469,471 A | 11/1995 | Wheatley, III et al. | |
| 5,548,812 A | 8/1996 | Padovani et al. | |
| 5,559,790 A | 9/1996 | Yano et al. | |
| 5,574,984 A | 11/1996 | Reed et al. | |
| 5,722,063 A | 2/1998 | Peterzell et al. | |
| 5,734,646 A | 3/1998 | I et al. | |
| 5,754,533 A | 5/1998 | Bender et al. | |
| 5,774,785 A | 6/1998 | Karlsson et al. | |
| 5,784,363 A | 7/1998 | Engstrom et al. | |
| 5,815,507 A | 9/1998 | Vinggaard et al. | |
| 5,839,056 A | 11/1998 | Hakkinen | |
| 5,859,383 A | 1/1999 | Davison et al. | |
| 5,933,768 A | 8/1999 | Skold et al. | |
| 5,956,642 A | 9/1999 | Larsson et al. | |
| 5,961,588 A | 10/1999 | Cooper et al. | |
| 5,995,488 A | 11/1999 | Kalkunte et al. | |
| 5,996,103 A | 11/1999 | Jahanghir | |
| 5,996,110 A | 11/1999 | Kosmach | |
| 6,006,073 A | 12/1999 | Glauner et al. | |
| 6,012,160 A | 1/2000 | Dent | |
| 6,038,220 A | 3/2000 | Kang et al. | |
| 6,044,072 A | 3/2000 | Ueda | |
| 6,047,189 A | 4/2000 | Yun et al. | 455/452 |
| 6,061,339 A | 5/2000 | Nieczyporowicz et al. | |
| 6,075,974 A | 6/2000 | Saints et al. | |
| 6,101,179 A | 8/2000 | Soliman | |
| 6,112,325 A | 8/2000 | Burshtein | |
| 6,144,841 A | 11/2000 | Feeney | |
| 6,154,659 A | 11/2000 | Jalali et al. | |
| 6,173,187 B1 | 1/2001 | Salonaho et al. | |
| 6,173,188 B1 | 1/2001 | Kim | |
| 6,175,587 B1 | 1/2001 | Madhow et al. | |
| 6,175,588 B1 | 1/2001 | Visotsky et al. | |
| 6,181,738 B1 | 1/2001 | Chheda et al. | |
| 6,188,678 B1 | 2/2001 | Prescott et al. | |
| 6,192,249 B1 | 2/2001 | Padovani | |
| 6,208,699 B1 | 3/2001 | Chen et al. | |
| 6,212,364 B1 | 4/2001 | Park | |
| 6,216,006 B1 | 4/2001 | Scholefield et al. | |
| 6,226,529 B1 | 5/2001 | Bruno et al. | |
| 6,397,070 B1 | 5/2002 | Black | |
| 6,446,236 B1 | 9/2002 | McEwen et al. | |
| 6,449,463 B1 | 9/2002 | Schiff et al. | |
| 6,519,705 B1 | 2/2003 | Leung | 713/300 |
| 6,532,563 B2 | 3/2003 | Nobelen | |
| 6,539,065 B1 | 3/2003 | Furukawa | |
| 6,553,231 B1 | 4/2003 | Karlsson et al. | |
| 6,560,744 B1 | 5/2003 | Burshtein | |
| 6,560,774 B1 | 5/2003 | Gordon et al. | |
| 6,574,211 B2 | 6/2003 | Padovani et al. | |
| 6,597,705 B1 | 7/2003 | Rezaiifar et al. | 370/468 |
| 6,597,923 B1 | 7/2003 | Vanghi et al. | |
| 6,597,932 B2 | 7/2003 | Tian et al. | |
| 6,603,746 B1 | 8/2003 | Larajani et al. | |
| 6,611,507 B1 | 8/2003 | Hottinen et al. | |
| 6,621,454 B1 | 9/2003 | Reudink et al. | |
| 6,628,956 B2 | 9/2003 | Bark et al. | |
| 6,643,520 B1 | 11/2003 | Park et al. | |
| 6,697,634 B1 | 2/2004 | Hayashi et al. | |
| 6,711,150 B1 | 3/2004 | Vanghi | |
| 6,711,515 B1 | 3/2004 | Lehtinen et al. | |
| 6,717,976 B1 | 4/2004 | Shen | |
| 6,721,373 B1 | 4/2004 | Frenkel et al. | |
| 6,744,743 B2 | 6/2004 | Walton et al. | |
| 6,745,045 B2 | 6/2004 | Terry et al. | |
| 6,751,444 B1 | 6/2004 | Meiyappan | |
| 6,763,244 B2 | 7/2004 | Chen et al. | |
| 6,801,515 B1 | 10/2004 | Ishikawa et al. | |
| 6,801,759 B1 | 10/2004 | Saifuddin et al. | |
| 6,807,164 B1 | 10/2004 | Almgren et al. | |
| 6,895,245 B2 | 5/2005 | Wallentin et al. | |
| 6,950,669 B2 | 9/2005 | Simonsson | |
| 6,952,591 B2 | 10/2005 | Budka et al. | |
| 6,968,201 B1 | 11/2005 | Gandhi et al. | |
| 6,977,912 B1 | 12/2005 | Porter et al. | |
| 7,012,912 B2 | 3/2006 | Naguib et al. | |
| 7,054,275 B2 | 5/2006 | Kim et al. | |
| 7,058,421 B2 | 6/2006 | Ngai et al. | |
| 7,062,288 B2 | 6/2006 | Raaf et al. | |
| 7,072,315 B1 * | 7/2006 | Liu et al. | 370/329 |
| 7,103,316 B1 | 9/2006 | Hall | |
| 7,145,935 B2 | 12/2006 | Won et al. | |
| 7,158,450 B2 | 1/2007 | Wada et al. | |
| 7,158,504 B2 | 1/2007 | Kadaba et al. | |
| 7,181,170 B2 | 2/2007 | Love et al. | |
| 7,184,381 B2 | 2/2007 | Ohkubo et al. | |
| 7,197,692 B2 | 3/2007 | Sutivong et al. | |
| 7,215,653 B2 | 5/2007 | Kim et al. | |
| 7,224,993 B2 | 5/2007 | Meyers et al. | |
| 7,254,158 B2 | 8/2007 | Agrawal et al. | |
| 7,302,276 B2 | 11/2007 | Bernhardsson et al. | |
| 7,310,526 B2 * | 12/2007 | Sang et al. | 455/436 |
| 7,324,785 B2 | 1/2008 | Hansen et al. | |
| 7,349,667 B2 | 3/2008 | Magee et al. | |
| 7,359,727 B2 | 4/2008 | Tsien et al. | |
| 7,359,838 B2 | 4/2008 | Marro et al. | |
| 7,400,887 B2 | 7/2008 | Azman et al. | |
| 7,418,241 B2 | 8/2008 | Bao et al. | |
| 7,420,939 B2 | 9/2008 | Laroia et al. | |
| 7,477,920 B2 | 1/2009 | Scheinert et al. | |
| 7,512,412 B2 | 3/2009 | Mese et al. | |
| 7,536,626 B2 | 5/2009 | Sutivong et al. | |
| 7,594,151 B2 | 9/2009 | Sutivong et al. | |
| 7,623,490 B2 | 11/2009 | Khandekar et al. | |
| 7,639,943 B1 | 12/2009 | Kalajan | |
| 7,808,895 B2 | 10/2010 | Nalawadi et al. | |
| 7,962,826 B2 | 6/2011 | Sutivong et al. | |
| 7,965,789 B2 * | 6/2011 | Khandekar et al. | 375/297 |
| 8,095,166 B2 | 1/2012 | Sampath et al. | |
| 8,116,800 B2 | 2/2012 | Gorokhov et al. | |
| 8,150,448 B2 | 4/2012 | Farnsworth et al. | |
| 2001/0040880 A1 | 11/2001 | Chen et al. | 370/337 |
| 2001/0053695 A1 | 12/2001 | Wallentin et al. | |
| 2001/0055968 A1 | 12/2001 | Yoshida et al. | |
| 2002/0018446 A1 | 2/2002 | Huh et al. | |
| 2002/0077138 A1 * | 6/2002 | Bark et al. | 455/522 |
| 2002/0077985 A1 | 6/2002 | Kobata et al. | |
| 2002/0102984 A1 | 8/2002 | Furuskar et al. | |
| 2002/0141349 A1 | 10/2002 | Kim et al. | |
| 2002/0145968 A1 | 10/2002 | Zhang et al. | |
| 2002/0167907 A1 | 11/2002 | Sarkar et al. | |
| 2002/0187801 A1 | 12/2002 | Vanghi | |
| 2002/0196766 A1 | 12/2002 | Hwang et al. | |
| 2003/0012425 A1 | 1/2003 | Suzuki et al. | |
| 2003/0013451 A1 | 1/2003 | Walton | |
| 2003/0016770 A1 | 1/2003 | Trans et al. | |
| 2003/0069014 A1 | 4/2003 | Raffel et al. | |
| 2003/0081538 A1 | 5/2003 | Walton et al. | |
| 2003/0086371 A1 | 5/2003 | Walton et al. | |
| 2003/0109274 A1 | 6/2003 | Budka et al. | |
| 2003/0123425 A1 | 7/2003 | Walton et al. | |
| 2003/0128705 A1 | 7/2003 | Yi et al. | |
| 2003/0185159 A1 | 10/2003 | Seo et al. | |
| 2003/0185285 A1 | 10/2003 | Talwar | |
| 2004/0038699 A1 | 2/2004 | Toono | |
| 2004/0062192 A1 | 4/2004 | Liu et al. | |
| 2004/0077370 A1 | 4/2004 | Dick et al. | 455/522 |
| 2004/0081121 A1 | 4/2004 | Xu | |
| 2004/0095880 A1 | 5/2004 | Laroia et al. | |
| 2004/0109432 A1 | 6/2004 | Laroia et al. | |
| 2004/0151109 A1 | 8/2004 | Batra et al. | |
| 2004/0166886 A1 | 8/2004 | Laroia et al. | |
| 2004/0166900 A1 | 8/2004 | Qiu et al. | |
| 2004/0203455 A1 | 10/2004 | Bao et al. | |
| 2004/0229615 A1 | 11/2004 | Agrawal | |
| 2004/0229639 A1 | 11/2004 | Meyers et al. | |
| 2005/0002324 A1 | 1/2005 | Sutivong et al. | |
| 2005/0013283 A1 | 1/2005 | Yoon et al. | |
| 2005/0026624 A1 | 2/2005 | Gandhi et al. | |
| 2005/0037796 A1 | 2/2005 | Tsai et al. | |
| 2005/0096061 A1 | 5/2005 | Ji et al. | |
| 2005/0113106 A1 | 5/2005 | Duan et al. | |
| 2005/0128970 A1 | 6/2005 | Tsien et al. | |
| 2005/0143118 A1 | 6/2005 | Bernhardsson et al. | |

| | | | | | | |
|---|---|---|---|---|---|---|
| 2005/0147063 A1 | 7/2005 | Pi et al. | EP | 1315310 A2 | 5/2003 | |
| 2005/0153690 A1 | 7/2005 | Marinier et al. | EP | 1320276 A2 | 6/2003 | |
| 2005/0176455 A1 | 8/2005 | Krishnan et al. | EP | 1515475 A1 | 3/2005 | |
| 2005/0192042 A1 | 9/2005 | Au et al. | GB | 2378858 A | 2/2003 | |
| 2005/0276248 A1 | 12/2005 | Butala et al. | JP | 2000-040999 | 2/2000 | |
| 2005/0283715 A1 | 12/2005 | Sutivong et al. | JP | 2000504529 | 4/2000 | |
| 2006/0009226 A1 | 1/2006 | Vicharelli et al. | JP | 2001044926 | 2/2001 | |
| 2006/0019496 A1 | 1/2006 | Onishi et al. | JP | 2001274748 | 10/2001 | |
| 2006/0019694 A1* | 1/2006 | Sutivong et al. ............... 455/522 | JP | 2001285193 | 10/2001 | |
| 2006/0025158 A1 | 2/2006 | Leblanc et al. | JP | 2001519618 | 10/2001 | |
| 2006/0034173 A1 | 2/2006 | Teague et al. | JP | 2001-358649 | 12/2001 | |
| 2006/0089154 A1 | 4/2006 | Laroia et al. | JP | 2002-026747 | 1/2002 | |
| 2006/0105796 A1 | 5/2006 | Malladi et al. | JP | 2002501353 A | 1/2002 | |
| 2006/0135080 A1 | 6/2006 | Khandekar et al. | JP | 2002077985 A | 3/2002 | |
| 2006/0135169 A1 | 6/2006 | Sampath et al. | JP | 2003-032218 | 1/2003 | |
| 2006/0164993 A1 | 7/2006 | Teague et al. | JP | 2003505973 | 2/2003 | |
| 2006/0165650 A1 | 7/2006 | Pavone et al. | JP | 2003510950 A | 3/2003 | |
| 2006/0171326 A1 | 8/2006 | Durand et al. | JP | 2003318818 A | 11/2003 | |
| 2006/0187885 A1 | 8/2006 | Roy et al. | JP | 2004502323 | 1/2004 | |
| 2006/0189344 A1 | 8/2006 | Umesh et al. | JP | 2004503126 A | 1/2004 | |
| 2006/0209721 A1 | 9/2006 | Mese et al. | JP | 2004-064142 | 2/2004 | |
| 2006/0211427 A1 | 9/2006 | Azman et al. | JP | 2004080340 A | 3/2004 | |
| 2006/0211441 A1 | 9/2006 | Mese et al. | JP | 2004104293 | 4/2004 | |
| 2006/0234752 A1 | 10/2006 | Mese et al. | JP | 2004214914 A | 7/2004 | |
| 2006/0262868 A1 | 11/2006 | Leshem | JP | 2004253899 A | 9/2004 | |
| 2006/0285503 A1 | 12/2006 | Mese et al. | JP | 2004260467 A2 | 9/2004 | |
| 2007/0030827 A1* | 2/2007 | Rui et al. ...................... 370/335 | JP | 2004533188 | 10/2004 | |
| 2007/0041429 A1* | 2/2007 | Khandekar ................... 375/146 | JP | 2002506334 | 11/2004 | |
| 2007/0081491 A1 | 4/2007 | Kim et al. | JP | 2005501444 A | 1/2005 | |
| 2007/0150799 A1 | 6/2007 | Sutivong et al. | JP | 2005502218 T | 1/2005 | |
| 2007/0161385 A1 | 7/2007 | Anderson | JP | 2005505954 A | 2/2005 | |
| 2007/0249363 A1 | 10/2007 | Amalfitano et al. | JP | 2005065182 A2 | 3/2005 | |
| 2007/0258525 A1 | 11/2007 | Jacobsen et al. | JP | 2005348433 A | 12/2005 | |
| 2007/0270100 A1 | 11/2007 | Agrawal et al. | JP | 2005537691 | 12/2005 | |
| 2007/0280170 A1 | 12/2007 | Kawasaki et al. | JP | 2005538650 | 12/2005 | |
| 2007/0286105 A1 | 12/2007 | Kim et al. | JP | 2007518361 A | 7/2007 | |
| 2008/0014980 A1 | 1/2008 | Yano et al. | JP | 2008-503925 | 2/2008 | |
| 2008/0031380 A1 | 2/2008 | Takabayashi | JP | 2008526136 A | 7/2008 | |
| 2008/0037439 A1 | 2/2008 | Cave et al. | JP | 2008-533924 | 8/2008 | |
| 2008/0039129 A1 | 2/2008 | Li et al. | JP | 2010200474 | 9/2010 | |
| 2008/0043880 A1 | 2/2008 | Matsushita | KR | 100262027 B1 | 7/2000 | |
| 2008/0045260 A1 | 2/2008 | Muharemovic et al. | KR | 2002-28664 | 4/2002 | |
| 2008/0056181 A1 | 3/2008 | Imamura et al. | KR | 20030004985 | 1/2003 | |
| 2008/0062956 A1 | 3/2008 | Kuroda et al. | KR | 20030004985 A | 1/2003 | |
| 2008/0117833 A1 | 5/2008 | Borran et al. | KR | 200324442 | 3/2003 | |
| 2008/0117849 A1 | 5/2008 | Borran et al. | KR | 2004-27165 | 4/2004 | |
| 2008/0161033 A1 | 7/2008 | Borran et al. | KR | 200427165 | 4/2004 | |
| 2008/0165675 A1 | 7/2008 | Yang et al. | KR | 20040088982 A | 10/2004 | |
| 2008/0166976 A1 | 7/2008 | Rao | RU | 2001531 | 10/1993 | |
| 2008/0214121 A1 | 9/2008 | Sutivong et al. | RU | 2120183 C1 | 10/1998 | |
| 2008/0267067 A1 | 10/2008 | Salazar et al. | RU | 2163053 | 2/2001 | |
| 2008/0291856 A1 | 11/2008 | Li et al. | RU | 2214680 | 1/2003 | |
| 2009/0023466 A1* | 1/2009 | Sutivong et al. ............... 455/522 | RU | 2198465 | 2/2003 | |
| 2009/0082052 A1 | 3/2009 | Bhushan et al. | RU | 2214690 C2 | 10/2003 | |
| 2009/0109939 A1 | 4/2009 | Bhushan et al. | RU | 2277762 | 6/2006 | |
| 2009/0117931 A1 | 5/2009 | Shin et al. | RU | 2360364 C2 | 6/2006 | |
| 2010/0027451 A1* | 2/2010 | Khandekar et al. ........... 370/311 | TW | 462155 | 11/2001 | |
| 2010/0061243 A1 | 3/2010 | Yi et al. | TW | 508910 | 11/2002 | |
| 2011/0105111 A1 | 5/2011 | Plestid et al. | TW | 546927 | 8/2003 | |
| 2011/0282999 A1 | 11/2011 | Teague et al. | TW | 584996 | 4/2004 | |
| 2011/0296279 A1 | 12/2011 | Sutivong et al. | WO | WO9427381 A1 | 11/1994 | |
| 2012/0083302 A1 | 4/2012 | Borran et al. | WO | WO9824198 | 6/1998 | |
| 2012/0270582 A1 | 10/2012 | Mese et al. | WO | WO9830057 | 7/1998 | |
| | | | WO | WO9918689 | 4/1999 | |
| FOREIGN PATENT DOCUMENTS | | | WO | WO9935865 A1 | 7/1999 | |
| CL | 001441995 | 12/1995 | WO | WO9945736 A1 | 9/1999 | |
| CL | 018411995 | 7/1996 | WO | WO 0014900 | * | 3/2000 |
| CL | 011191997 | 3/1998 | WO | 0055976 | 9/2000 | |
| CL | 1190848 | 8/1998 | WO | WO0108325 | 2/2001 | |
| CL | 004421998 | 11/1998 | WO | 0120808 | 3/2001 | |
| CL | 033582005 | 12/2006 | WO | WO0117158 | 3/2001 | |
| CL | 005752006 | 2/2007 | WO | WO0124402 | 4/2001 | |
| CN | 1250342 | 4/2000 | WO | WO0178291 A2 | 10/2001 | |
| EP | 0668662 A1 | 8/1995 | WO | 0182504 | 11/2001 | |
| EP | 0673125 A1 | 9/1995 | WO | WO0232179 A1 | 4/2002 | |
| EP | 0715423 A1 | 6/1996 | WO | WO0239609 | 5/2002 | |
| EP | 0767548 | 4/1997 | WO | WO0249305 | 6/2002 | |
| EP | 0889663 A1 | 1/1999 | WO | WO02091597 | 11/2002 | |
| EP | 0955736 A2 | 5/1999 | WO | 03034645 | 4/2003 | |

| | | |
|---|---|---|
| WO | WO03085878 A1 | 10/2003 |
| WO | 04025869 | 3/2004 |
| WO | WO2004025986 A2 | 3/2004 |
| WO | WO2004032548 A1 | 4/2004 |
| WO | 2004042954 | 5/2004 |
| WO | WO2004059874 A1 | 7/2004 |
| WO | 2004105294 | 12/2004 |
| WO | WO2004104530 | 12/2004 |
| WO | WO2005034545 A1 | 4/2005 |
| WO | WO2006007318 A1 | 1/2006 |
| WO | 06012376 | 2/2006 |
| WO | WO2007014037 A2 | 2/2007 |
| WO | WO2007050846 A1 | 5/2007 |
| WO | WO2007112141 A2 | 10/2007 |
| WO | WO2007146891 A2 | 12/2007 |
| WO | WO2008030823 | 3/2008 |

OTHER PUBLICATIONS

Written Opinion—PCT/US05/020086, International Search Authority—European Patent Office, Oct. 4, 2005.

International Preliminary Examination Report—PCT/US05/020086, International Search Authority—European Patent Office, Oct. 4, 2005.

International Search Report—PCT/US05/020087, International Search Authority—European Patent Office, Oct. 4, 2005.

Written Opinion—PCT/US05/020087, International Search Authority—European Patent Office, Oct. 4, 2005.

International Preliminary Examination Report—PCT/US05/020087, International Search Authority—European Patent Office, Oct. 4, 2005.

Written Opinion—PCT/US05/020092, International Search Authority—European Patent Office, Nov. 28, 2005.

TIA/EIA/IS-95 "Mobile Station-Base Station Compatibility Standard for Dual-Mode Wideband Spread Spectrum Cellular System" Jul. 1993.

International Preliminary Report on Patentability—PCT/US05/020092, IPEA, US, Oct. 27, 2008.

Damnjanovic and Vanghi, "IS-2000 Enhanced Closed Loop Power Control for Turbo Coding," IEEE 54th Vehicular Technology Proceedings, Oct. 7-11, 2001, XP-010562383.

International Search Report—PCT/US05/020092, International Search Authority—European Patent Office, Nov. 28, 2005.

Elmusrati, et al., "Multi-Objective Distributed Power Control Algorithm" Vehicular Technology Conference Proceedings VTC 2002 Fall IEEE 56th, vol. 2, pp. 812-816.

Tomcik, T.: "QTDD Performance Report 2," IEEE C802.20-05/88, IEEE 802.20 Working Group on Mobile Broadband Wireless Access, <http://ieee802.org/20/>, pp. 1-56, XP002386798 (Nov. 15, 2005).

Hosein, "Interference Management of OFDMA Uplinks," IEEE 65th Vehicular Technology Conference, VTC2007—Spring, pp. 2435-2439, Apr. 22-25, 2007.

Nevdyaev, L.M., "Telecommunication Technologies," Moscow, Business and Communications, 2002, p. 140.

Tanaka et al., Fast initial acquisition of transmitter power for the reverse link DS/CDMA cellular systems, May 1998, IEEE Vehicular Technology Conference, p. 2436-2440.

Bowie, Song, et al., "Iterative Joint Channel Estimation and Signal Detection in MIMO OFDM Systems," Institute of Image Communication and Information Processing, Shanghai Jiao Tong University Shanghai, China, 2005, pp. 39-43.

European Search Report—EP08008762—Search Authority—Munich—Jun. 22, 2011.

Roberto Padovani, "The Application of Spread Spectrum to PCS has Become a Reality Reverse Link Performance of IS-95 Based Cellular Systems," IEEE Personal Communication, US, IEEE Communications Society, vol. 1, No. 3, Jul. 1, 1994, pp. 28-34.

Shao, L. et al.; "Downlink multicell MIMO-OFDM: An architecture for next generation wireless networks," in Proc. IEEE Wireless Commun. and Networking Conf. (WCNC), vol. 2, Santa Clara, USA, Mar. 2005, pp. 1120-1125.

U.S. Appl. No. 60/516,557, "Layered Frequency Hopping for OFDMA", filed Oct. 30, 2003 by Ji. et al., 6 pages.

Qualcomm Incorporated: QFDD Technology Overview Presentation, IEEE 802.20 Working Group on Mobile Broadband Wireless Access, C802.20-05-59, Nov. 2005, XP002518168, Retrieved from Internet: URL:http://grouper.ieee.org/groups/802/20/Contributions.html, pp. 45-47, Oct. 28, 2005.

Taiwan Search Report —TW094120044—TIPO—Jun. 5, 2012.

Tomcik, Jim: "QFDD and QTDD: Technology Overview", IEEE 802.20 Working Group on Mobile Broadband Wireless Access, XP002480491, Oct. 28, 2005, pp. 1, 61-106, Retrieved from Internet: URL: http://grouper.iee.org/groups/802/20/Contributions.html.

C30-20060327-023, "QUALCOMM Proposal for 3GPP2 Air Interface Evolution Phase 2", Dallas, TX, Mar. 2006.

\* cited by examiner

POWER CONTROL FOR A WIRELESS COMMUNICATION SYSTEM UTILIZING ORTHOGONAL MULTIPLEXING

CLAIM OF PRIORITY UNDER 35 U.S.C. §119

The present Application for Patent claims priority to Provisional Application No. 60/580,819 entitled "Reverse-Link Power Control Algorithm" filed Jun. 18, 2004, and assigned to the assignee hereof and hereby expressly incorporated by reference herein.

REFERENCE TO CO-PENDING APPLICATIONS FOR PATENT

The present application for patent is related to the following co-pending U.S. patent applications:

"Robust Erasure Detection and Erasure-Rate-Based Closed Loop Power Control" by Arak Sutivong et al, filed Jul. 13, 2004, assigned to the assignee hereof, and expressly incorporated by reference herein.

BACKGROUND

I. Field

The present invention relates generally to communication, and more specifically to power control for a wireless communication system.

II. Background

A wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations.

Multiple terminals may simultaneously transmit on the reverse link by multiplexing their transmissions to be orthogonal to one another. The multiplexing attempts to achieve orthogonality among the multiple reverse link transmissions in time, frequency, and/or code domain. Complete orthogonality, if achieved, results in the transmission from each terminal not interfering with the transmissions from other terminals at a receiving base station. However, complete orthogonality among the transmissions from different terminals is often not realized due to channel conditions, receiver imperfections, and so on. The loss in orthogonality results in each terminal causing some amounts of interference to other terminals communicating with the same base station. Furthermore, the transmissions from terminals communicating with different base stations are typically not orthogonal to one another. Thus, each terminal may also cause interference to terminals communicating with nearby base stations. The performance of each terminal is then degraded by the interference from all other terminals in the system.

There is therefore a need in the art for techniques to mitigate the effects of interference so that improved performance may be achieved.

SUMMARY

Techniques for controlling transmit power for a data transmission from a wireless terminal in a manner to mitigate both "intra-sector" interference and "inter-sector" interference are described herein. The transmit power is adjusted such that the amount of intra-sector interference the terminal may cause to a "serving" base station and the amount of inter-sector interference the terminal may cause to "neighbor" base stations are both maintained within acceptable levels. (The terms in quote are described below.) The amount of inter-sector interference the terminal may cause may be roughly estimated based on (1) the total interference observed by each neighbor base station, (2) channel gains for the serving and neighbor base stations, (3) the current transmit power level used by the terminal, and (4) possibly other parameters. Each base station may broadcast a report (e.g., a single bit) indicative of the total interference observed by that base station. The channel gain for each base station may be estimated based on a pilot received from the base station. The transmit power may be adjusted in a probabilistic manner, a deterministic manner, or some other manner based on these various parameters.

In general, the transmit power may be decreased if high interference is observed by neighbor base stations and increased if low interference is observed. The transmit power may also be adjusted by a larger amount and/or more frequently if (1) the terminal is located closer to a neighbor base station observing high interference and/or (2) the current transmit power level is higher. The transmit power may be adjusted by a smaller amount and/or less frequently if (1) the terminal is located closer to the serving base station and/or (2) the current transmit power level is lower. The intra-sector interference caused by the terminal is maintained within an acceptable level by limiting the received signal quality (SNR) for the data transmission to be within a range of allowable SNRs.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
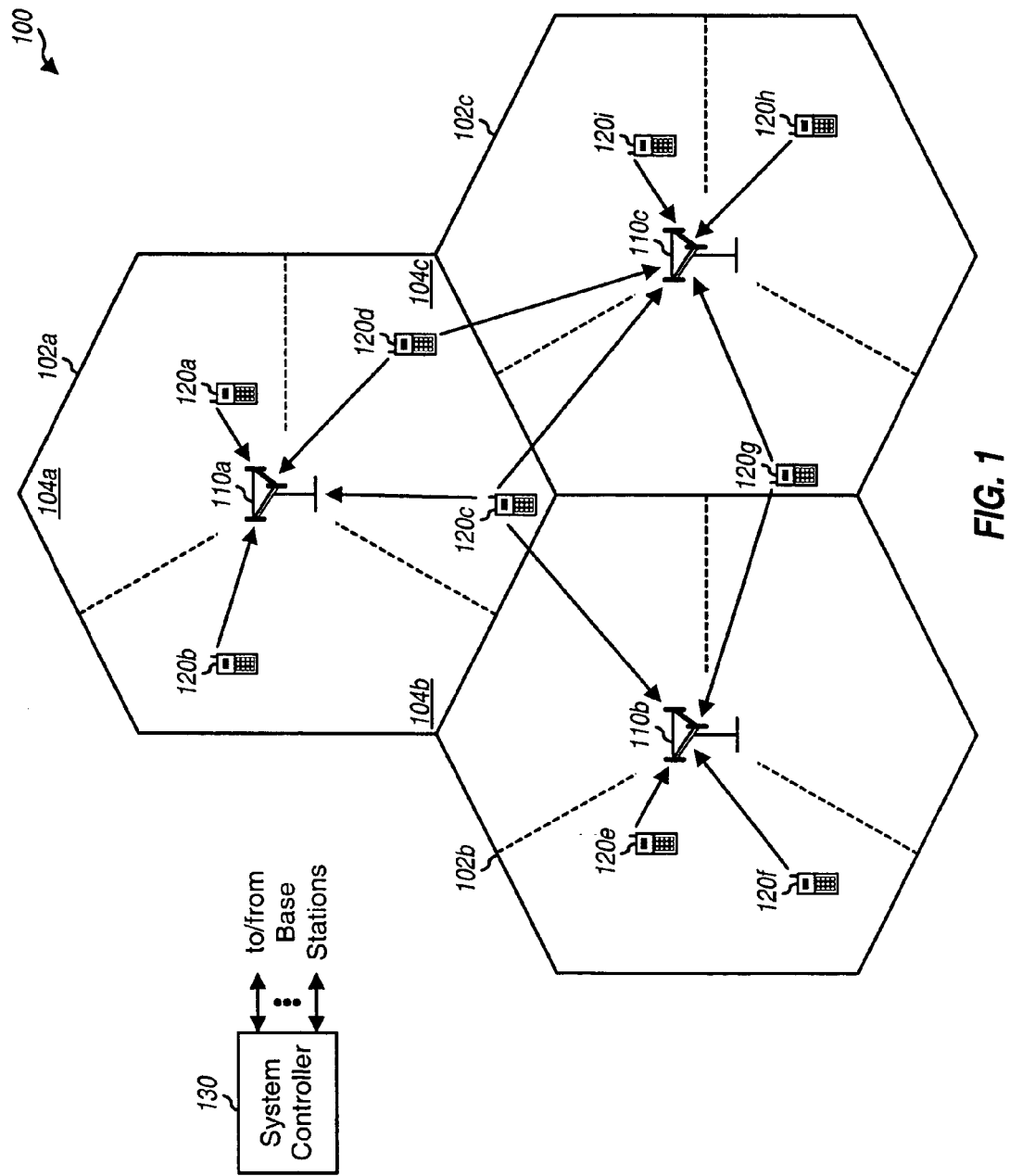
FIG. 1 shows a wireless multiple-access communication system.

FIG. 1 shows a wireless multiple-access communication system 100. System 100 includes a number of base stations 110 that support communication for a number of wireless terminals 120. Terminals 120 are typically dispersed throughout the system, and each terminal may be fixed or mobile. A terminal may also be referred to as a mobile station, a user equipment (UE), a wireless communication device, or some other terminology. A base station is a fixed station used for communicating with the terminals and may also be referred to as an access point, a Node B, or some other terminology. A system controller 130 couples to base stations 110, provides coordination and control for these base stations, and further controls the routing of data for the terminals served by these base stations.

Each base station 110 provides communication coverage for a respective geographic area 102. A base station and/or its coverage area may be referred to as a "cell", depending on the context in which the term is used. To increase capacity, the coverage area of each base station may be partitioned into multiple (e.g., three) sectors 104. Each sector is served by a base transceiver subsystem (BTS). The term "sector" can refer to a BTS and/or its coverage area, depending on the context in which the term is used. For a sectorized cell, the base station for that cell typically includes the BTSs for all sectors of that cell. For simplicity, in the following description, the term "base station" is used generically for both a fixed station that serves a cell and a fixed station that serves a sector. A "serving" base station or "serving" sector is one with which a terminal communicates. A "neighbor" base station or "neighbor" sector is one with which the terminal is not in communication. For simplicity, the following description assumes that each terminal communicates with one serving base station, although this is not a required limitation for the techniques described herein.

The power control techniques described herein may be used for various wireless communication systems. For example, these techniques may be used for a Time Division Multiple Access (TDMA) system, a Frequency Division Multiple Access (FDMA) system, an orthogonal frequency division multiple access (OFDMA) system, and so on. A TDMA system uses time division multiplexing (TDM), and transmissions for different terminals are orthogonalized by transmitting in different time intervals. An FDMA system uses frequency division multiplexing (FDM), and transmissions for different terminals are orthogonalized by transmitting in different frequency subbands. TDMA and FDMA systems may also use code division multiplexing (CDM). In this case, transmissions for multiple terminals may be orthogonalized using different orthogonal (e.g., Walsh) codes even though they are sent in the same time interval or frequency subband. An OFDMA system utilizes orthogonal frequency division multiplexing (OFDM), which effectively partitions the overall system bandwidth into a number of (N) orthogonal frequency subbands. These subbands are also referred to as tones, sub-carriers, bins, frequency channels, and so on. Each subband is associated with a respective sub-carrier that may be modulated with data. An OFDMA system may use any combination of time, frequency, and/or code division multiplexing. For clarity, the power control techniques are described below for an OFDMA system.

For an OFDMA system, multiple "traffic" channels may be defined whereby (1) each subband is used for only one traffic channel in any given time interval and (2) each traffic channel may be assigned zero, one, or multiple subbands in each time interval. The traffic channels may include "data" channels used to send traffic/packet data and "control" channels used to send overhead/control data. The traffic channels may also be referred to as physical channels, transport channels, or some other terminology.

The traffic channels for each sector may be defined to be orthogonal to one another in time and frequency so that no two traffic channels use the same subband in any given time interval. This orthogonality avoids intra-sector interference among multiple transmissions sent simultaneously on multiple traffic channels in the same sector. Some loss of orthogonality may result from various effects such as, for example, inter-carrier interference (ICI) and inter-symbol interference (ISI). This loss of orthogonality results in intra-sector interference. The traffic channels for each sector may also be defined to be pseudo-random with respect to the traffic channels for nearby sectors. This randomizes the inter-sector or "other-sector" interference caused by traffic channels in one sector to traffic channels in nearby sectors. Randomized intra-sector interference and inter-sector interference may be achieved in various manners. For example, frequency hopping can provide randomized intra-sector and inter-sector interference as well as frequency diversity against deleterious path effects.

Figure 2:
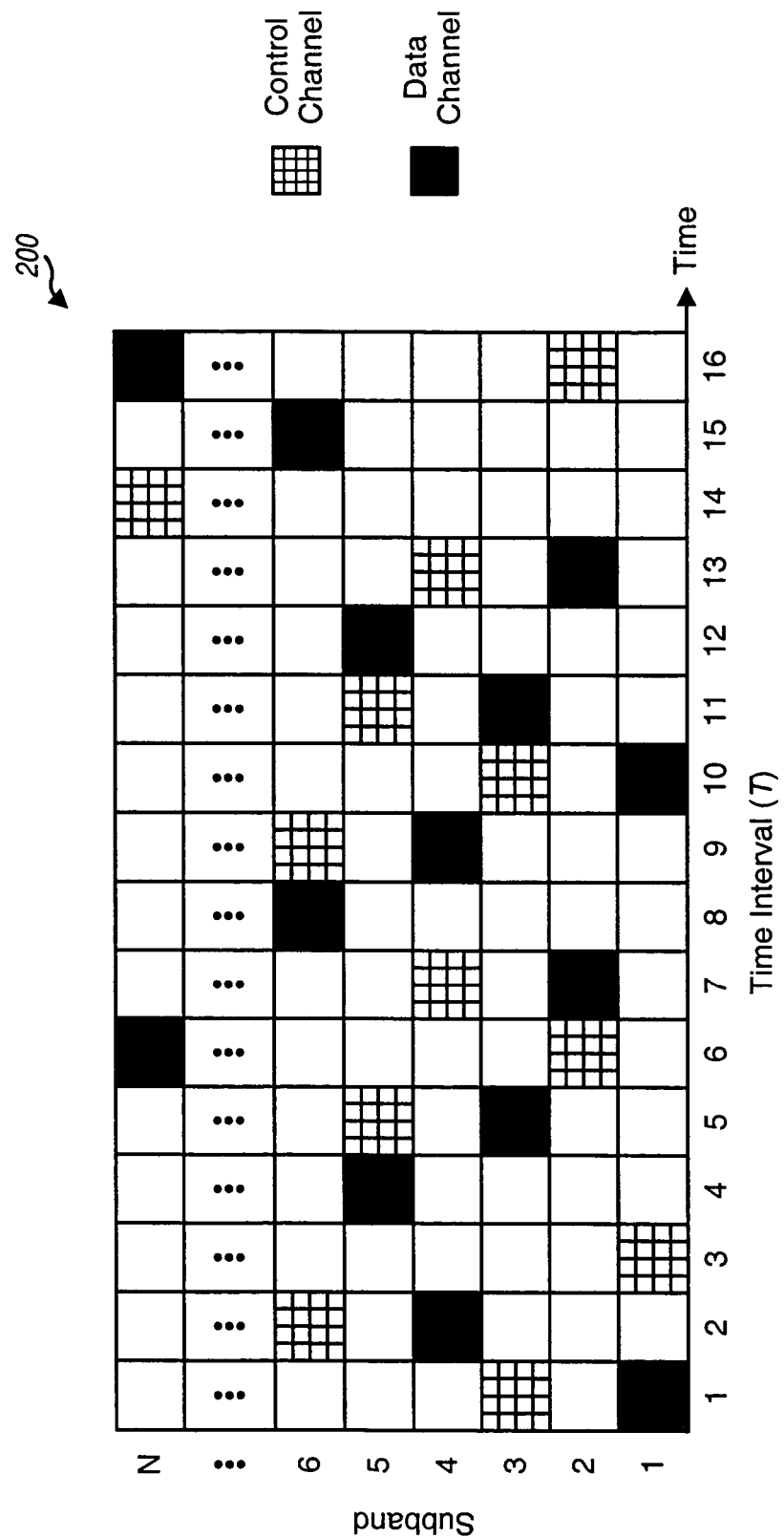
FIG. 2 illustrates frequency hopping on a time-frequency plane.

FIG. 2 illustrates frequency hopping (FH) on a time-frequency plane 200 for an OFDMA system. With frequency hopping, each traffic channel is associated with a specific FH sequence that indicates the particular subband(s) to use for that traffic channel in each time interval. The FH sequences for different traffic channels in each sector are orthogonal to one another so that no two traffic channels use the same subband in any time interval. The FH sequences for each sector are also pseudo-random with respect to the FH sequences for nearby sectors. Interference between two traffic channels in two sectors occurs whenever these two traffic channels use the same subband in the same time interval. However, the inter-sector interference is randomized due to the pseudo-random nature of the FH sequences used for different sectors.

Data channels may be assigned to active terminals such that each data channel is used by only one terminal at any given time. To conserve system resources, control channels may be shared among multiple terminals using, e.g., code division multiplexing. If the data channels are orthogonally multiplexed only in frequency and time (and not code), then they are less susceptible to loss in orthogonality due to channel conditions and receiver imperfections than the control channels.

The data channels thus have several key characteristics that are pertinent for power control. First, intra-cell interference on the data channels is minimal because of the orthogonal multiplexing in frequency and time. Second, inter-cell interference is randomized because nearby sectors use different FH sequences. The amount of inter-cell interference caused by a given terminal is determined by (1) the transmit power level used by that terminal and (2) the location of the terminal relative to the neighbor base stations.

For the data channels, power control may be performed such that each terminal is allowed to transmit at a power level that is as high as possible while keeping intra-cell and inter-cell interference to within acceptable levels. A terminal located closer to its serving base station may be allowed to transmit at a higher power level since this terminal will likely cause less interference to neighbor base stations. Conversely, a terminal located farther away from its serving base station and toward a sector edge may be allowed to transmit at a lower power level since this terminal may cause more interference to neighbor base stations. Controlling transmit power in this manner can potentially reduce the total interference observed by each base station while allowing "qualified" terminals to achieve higher SNRs and thus higher data rates.

Power control for the data channels may be performed in various manners to attain the goals noted above. For clarity, a specific embodiment of power control is described below. For this embodiment, the transmit power for a data channel for a given terminal may be expressed as:

$$P_{dch}(n) = P_{ref}(n) + \Delta P(n) \qquad \text{Eq (1)}$$

where $P_{dch}(n)$ is the transmit power for the data channel for update interval n;

$P_{ref}(n)$ is a reference power level for update interval n; and $\Delta P(n)$ is a transmit power delta for update interval n.

The power levels $P_{dch}(n)$ and $P_{ref}(n)$ and the transmit power delta $\Delta P(n)$ are given in units of decibels (dB).

The reference power level is the amount of transmit power needed to achieve a target signal quality for a designated transmission (e.g., on a control channel). Signal quality (denoted as SNR) may be quantified by a signal-to-noise ratio, a signal-to-noise-and-interference ratio, and so on. The reference power level and the target SNR may be adjusted by a power control mechanism to achieve a desired level of performance for the designated transmission, as described below. If the reference power level can achieve the target SNR, then the received SNR for the data channel may be estimated as:

$$SNR_{dch}(n) = SNR_{target} + \Delta P(n) \quad \text{Eq (2)}$$

Equation (2) assumes that the data channel and the control channel have similar interference statistics. This is the case, for example, if the control and data channels from different sectors may interfere with one another. The reference power level may be determined as described below.

The transmit power for the data channel may be set based on various factors such as (1) the amount of inter-sector interference the terminal may be causing to other terminals in neighbor sectors, (2) the amount of intra-sector interference the terminal may be causing to other terminals in the same sector, (3) the maximum power level allowed for the terminal, and (4) possibly other factors. Each of these factors is described below.

The amount of inter-sector interference each terminal may cause may be determined in various manners. For example, the amount of inter-sector interference caused by each terminal may be directly estimated by each neighbor base station and sent to the terminal, which may then adjust its transmit power accordingly. This individualized interference reporting may require extensive overhead signaling. For simplicity, the amount of inter-sector interference each terminal may cause may be roughly estimated based on (1) the total interference observed by each neighbor base station, (2) the channel gains for the serving and neighbor base stations, and (3) the transmit power level used by the terminal. Quantities (1) and (2) are described below.

Each base station can estimate the total or average amount of interference observed by that base station. This may be achieved by estimating the interference power on each subband and computing an average interference power based on the interference power estimates for the individual subbands. The average interference power may be obtained using various averaging techniques such as, for example, arithmetic averaging, geometric averaging, SNR-based averaging, and so on.

For arithmetic averaging, the average interference power may be expressed as:

$$I_{meas,m}(n) = \frac{1}{N} \sum_{k=1}^{N} I_m(k, n), \quad \text{Eq (3)}$$

where $I_m(k,n)$ is the interference power estimate for sector m on subband k in time interval n; and $I_{meas,m}(n)$ is the average interference power for sector m in time interval n.

The quantities $I_m(k,n)$ and $I_{meas,m}(n)$ are in linear units in equation (3) but may also be given in decibel (dB). With arithmetic averaging, a few large interference power estimates can skew the average interference power.

For geometric averaging, the average interference power may be expressed as:

$$I_{meas,m}(n) = \left(\prod_{k=1}^{N} I_m(k, n)\right)^{1/N}. \quad \text{Eq (4)}$$

Geometric averaging can suppress large interference power estimates for a few subbands, so that the average interference power is lower than with arithmetic averaging.

For SNR-based averaging, the average interference power may be expressed as:

$$\log\left(1 + \frac{P_{nom}}{I_{meas,m}(n)}\right) = \frac{1}{N} \cdot \sum_{k=1}^{N} \log\left(1 + \frac{P_{nom}}{I_m(k, n)}\right), \quad \text{Eq (5)}$$

where $P_{norm}$ denotes a nominal received power assumed for each subband. Equation (5) determines the theoretical capacity of each subband based on the nominal received power, computes the average capacity for all N subbands, and determines an average interference power that gives the average capacity. SNR-based averaging (which may also be called capacity-based averaging) also suppresses large interference power estimates for a few subbands.

Regardless of which averaging technique is used, each base station may filter the interference power estimates and/or the average interference power over multiple time intervals to improve the quality of the interference measurement. The filtering may be achieved with a finite impulse response (FIR) filter, an infinite impulses response (IIR) filter, or some other types of filter known in the art. The term "interference" may thus refer to filtered or unfiltered interference in the description herein.

Each base station may broadcast its interference measurements for use by terminals in other sectors. The interference measurements may be broadcast in various manners. In one embodiment, the average interference power (or the "measured" interference) is quantized to a predetermined number of bits, which are then sent via a broadcast channel. In another embodiment, the measured interference is broadcast using a single bit that indicates whether the measured interference is greater than or below a nominal interference threshold. In yet another embodiment, the measured interference is broadcast using two bits. One bit indicates the measured interference relative to the nominal interference threshold. The other bit may be used as a distress/panic bit that indicates whether the measured interference exceeds a high interference threshold. The interference measurements may also be sent in other manners.

For simplicity, the following description assumes the use of a single other-sector interference (OSI) bit to provide interference information. Each base station may set its OSI bit (OSIB) as follows:

$$OSIB(n) = \begin{cases} \text{`1'}, & \text{if } I_{meas,m}(n) \geq I_{target}, \text{ and} \\ \text{`0'}, & \text{if } I_{meas,m}(n) < I_{target}, \end{cases} \quad \text{Eq (6)}$$

where $I_{target}$ is the nominal interference threshold.

Alternatively, each base station may obtain a measured interference-over-thermal (IOT), which is a ratio of the total interference power observed by the base station to the thermal noise power. The total interference power may be computed as described above. The thermal noise power may be estimated by turning off the transmitter and measuring the noise at the receiver. A specific operating point may be selected for the system and denoted as $IOT_{target}$. A higher operating point allows the terminals to use higher transmit powers (on average) for the data channels. However, a very high operating point may not be desirable since the system can become interference limited, which is a situation whereby an increase in transmit power does not translate to an increase in received SNR. Furthermore, a very high operating point increases the likelihood of system instability. In any case, each base station may set its OSI bit as follows:

$$OSIB(n) = \begin{cases} \text{'1'}, & \text{if } IOT_{meas,m}(n) \geq IOT_{target}, \text{ and} \\ \text{'0'}, & \text{if } IOT_{meas,m}(n) < IOT_{target}, \end{cases} \quad \text{Eq (7)}$$

where $IOT_{meas,m}(n)$ is the measured IOT for sector m in time interval n; and $IOT_{target}$ is the desired operating point for the sector.

For both cases, the OSI bit may be used for power control as described below.

Each terminal can estimate the channel gain (or propagation path gain) for each base station that may receive a reverse link transmission from the terminal. The channel gain for each base station may be estimated by processing a pilot received from the base station via the forward link, estimating the received pilot strength/power, and filtering pilot strength estimates over time (e.g., with a filter having a time constant of several hundred milli-seconds) to remove the effects of fast fading and so on. If all base stations transmit their pilots at the same power level, then the received pilot strength for each base station is indicative of the channel gain between that base station and the terminal. The terminal may form a channel gain ratio vector, $\underline{G}$, as follows:

$$\underline{G} = [r_1(n) \; r_2(n) \; \ldots \; r_M(n)], \quad \text{Eq (8)}$$

where $$r_i(n) = \frac{g_s(n)}{g_{ni}(n)}, \quad \text{Eq (9)}$$

$g_s(n)$ is the channel gain between the terminal and the serving base station;

$g_{ni}(n)$ is the channel gain between the terminal and neighbor base station i; and $r_i(n)$ is the channel gain ratio for neighbor base station i.

Since distance is inversely related to channel gain, the channel gain ratio $g_s(n)/g_{ni}(n)$ may be viewed as a "relative distance" that is indicative of the distance to a neighbor base station i relative to the distance to the serving base station. In general, the channel gain ratio for a neighbor base station, $r_i(n)$, decreases as the terminal moves toward the sector edge and increases as the terminal moves closer to the serving base station. The channel gain ratio vector, $\underline{G}$ may be used for power control as described below.

Although the data channels for each sector are multiplexed such that they are orthogonal to one another, some loss in orthogonality may result from inter-carrier interference (ICI), intersymbol interference (ISI), and so on. This loss of orthogonality causes intra-sector interference. To mitigate intra-sector interference, the transmit power of each terminal may be controlled such that the amount of intra-sector interference that this terminal may cause to other terminals in the same sector is maintained within an acceptable level. This may be achieved, for example, by requiring the received SNR for the data channel for each terminal to be within a predetermined SNR range, as follows:

$$SNR_{dch}(n) \in [SNR_{min}, SNR_{max}], \quad \text{Eq (10)}$$

where $SNR_{min}$ is the minimum received SNR allowable for a data channel; and $SNR_{max}$ is the maximum received SNR allowable for a data channel.

The minimum received SNR ensures that all terminals, especially those located near the sector edge, can achieve a minimum level of performance. Without such a constraint, terminals located near the sector edge may be forced to transmit at an extremely low power level, since they often contribute a significant amount of inter-sector interference.

If the received SNRs for the data channels for all terminals are constrained to be within the range $[SNR_{min}, SNR_{max}]$, then the amount of intra-sector interference caused by each terminal due to a loss of orthogonality may be assumed to be within the acceptable level. By limiting the received SNRs to be within this SNR range, there can still be as much as $(SNR_{max}-SNR_{min})$ dB difference in received power spectral density between adjacent subbands (assuming that similar amounts of inter-sector interference are observed on the subbands, which is true, e.g., if the control and data channels hop randomly so that the control and data channels from different sectors may collide with one another). A small SNR range improves the robustness of the system in the presence of ICI and ISI. An SNR range of 10 dB has been found to provide good performance in most operating scenarios. Other SNR ranges may also be used.

If the transmit power for the data channel is determined as shown in equation (1), then the received SNR for the data channel may be maintained within the range of $[SNR_{min}, SNR_{max}]$ by constraining the transmit power delta, $\Delta P(n)$, to be within a corresponding range, as follows:

$$\Delta P(n) \in [\Delta P_{min}, \Delta P_{max}] \quad \text{Eq (11)}$$

where $\Delta P_{min}$ is the minimum transmit power delta allowable for a data channel, and $\Delta P_{max}$ is the maximum transmit power delta allowable for a data channel.

In particular, $\Delta P_{min} = SNR_{min} - SNR_{target}$ and $\Delta P_{max} = SNR_{max} - SNR_{target}$. In another embodiment, the transmit power $P_{dch}(n)$ may be constrained to be within a range that is determined, for example, based on the received signal power for the data channel. This embodiment may be used, for example, if interference power is statistically different among the subbands.

The transmit power for the data channel for each terminal may then be adjusted based on the following parameters:

The OSI bit broadcast by each base station;

The channel gain ratio vector, $\underline{G}$, computed by the terminal;

The range of received SNRs allowable for the data channels, $[SNR_{min}, SNR_{max}]$, or equivalently the range of allowable transmit power deltas, $[\Delta P_{min}, \Delta P_{max}]$; and The maximum power level, $P_{max}$, allowed for the terminal, which may set by the system or the power amplifier within the terminal.

Parameters 1) and 2) relate to the inter-sector interference caused by the terminal. Parameter 3) relates to the intra-sector interference caused by the terminal.

In general, a terminal located close to a neighbor sector that reports high interference may transmit with a lower transmit power delta so that its received SNR is closer to $SNR_{min}$. Conversely, a terminal located close to its serving base station may transmit with a higher transmit power delta so that its received SNR is closer to $SNR_{max}$. A gradation of received SNRs may be observed for the terminals in the system based on their proximity to the serving base stations. A scheduler at each base station can take advantage of the distribution of received SNRs to achieve high throughput while ensuring fairness for the terminals.

The transmit power for the data channel may be adjusted in various manners based on the four parameters noted above. The power control mechanism does not need to maintain equal SNR for all terminals, especially in an orthogonal system like an OFDMA system, where terminals closer to a base station may transmit at higher power levels without causing much problem to other terminals. For clarity, a specific embodiment for adjusting transmit power is described below. For this embodiment, each terminal monitors the OSI bits broadcast by neighbor base stations and only responds to the OSI bit of the strongest neighbor base station, which has the smallest channel gain ratio in the vector G. If the OSI bit of a given base station is set to '1' (due to the base station observing higher than nominal inter-sector interference), then the transmit powers of terminals having this base station as their strongest neighbor base station may be adjusted downward. Conversely, if the OSI bit is set to '0', then the transmit powers of terminals having this base station as their strongest neighbor base station may be adjusted upward. For other embodiments, each terminal may adjust its transmit power based on one or multiple OSI bits obtained for one or multiple base stations (e.g., serving and/or neighbor base stations).

The OSI bit thus determines the direction in which to adjust the transmit power. The amount of transmit power adjustment for each terminal may be dependent on (1) the current transmit power level (or the current transmit power delta) of the terminal and (2) the channel gain ratio for the strongest neighbor base station. Table 1 lists some general rules for adjusting the transmit power based on the transmit power delta and the channel gain ratio for the strongest base station.

TABLE 1

| OSI Bit | Transmit Power Adjustment |
|---|---|
| '1' (high interference level) | A terminal with a smaller channel gain ratio for (and is thus closer to) the base station transmitting the OSI bit, in general, decreases its transmit power delta by a larger amount in comparison to a terminal with a larger channel gain ratio for (and is thus farther away from) this base station. A terminal with a larger transmit power delta, in general, decreases its transmit power delta by a larger amount in comparison to a terminal with a similar channel gain ratio for this base station but a smaller transmit power delta. |
| '0' (low interference level) | A terminal with a larger channel gain ratio for (and is thus farther away from) the base station transmitting the OSI bit, in general, increases its transmit power delta by a larger amount in comparison to a terminal with a smaller channel gain ratio for (and is thus closer to) this base station. A terminal with a smaller transmit power delta, in general, increases its transmit power delta by a larger amount in comparison to a terminal with a similar channel gain ratio for this base station but a larger transmit power delta. |

The transmit power may be adjusted in a deterministic manner, a probabilistic manner, or some other manner. For deterministic adjustment, the transmit power is adjusted in a pre-defined manner based on the pertinent parameters. For probabilistic adjustment, the transmit power has a certain probability of being adjusted, with the probability being determined by the pertinent parameters. Exemplary deterministic and probabilistic adjustment schemes are described below.

Figure 3:
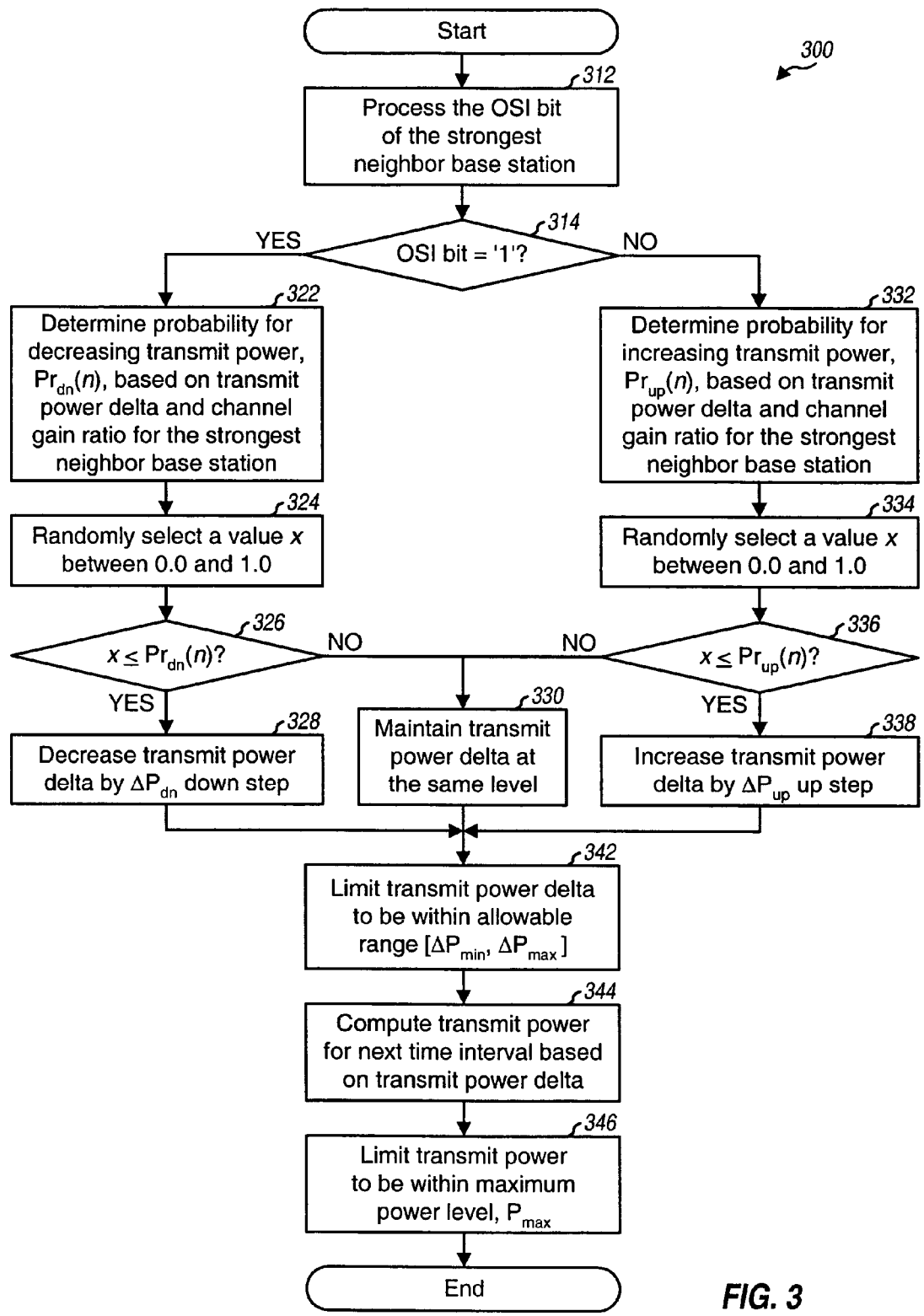
FIG. 3 shows a process for adjusting transmit power in a probabilistic manner.

FIG. 3 shows a flow diagram of a process 300 for adjusting transmit power in a probabilistic manner. Process 300 may be performed by each terminal and for each time interval in which an OSI bit is transmitted. Initially, the terminal processes the OSI bit of the strongest neighbor base station (block 312). The terminal then determines whether the OSI bit is '1' or '0' (block 314).

If the OSI bit is '1', indicating a higher than nominal interference level, then the terminal determines a probability for decreasing the transmit power, $Pr_{dn}(n)$ (block 322). $Pr_{dn}(n)$ may be computed based on the current transmit power delta, $\Delta P(n)$, and the channel gain ratio for the strongest neighbor base station, $r_{osib}(n)$ as described below. The terminal then randomly selects a value x between 0.0 and 1.0 (block 324). In particular, x is a random variable uniformly distributed between 0.0 and 1.0. If the randomly selected value x is less than or equal to the probability $Pr_{dn}(n)$, as determined in block 326, then the terminal decreases its transmit power delta by a $\Delta P_{dn}$ down step (block 328), as follows:

$$\Delta P(n+1) = \Delta P(n) - \Delta P_{dn}. \quad \text{Eq (12)}$$

Otherwise, if x is greater than $Pr_{dn}(n)$ then the terminal maintains the transmit power delta at the current level (block 330). From blocks 328 and 330, the process proceeds to block 342.

If the OSI bit is '0' in block 314, indicating a lower than nominal interference level, then the terminal determines a probability for increasing the transmit power, $Pr_{up}(n)$, e.g., based on $\Delta P(n)$ and $r_{osib}(n)$ as also described below (block 332). The terminal then randomly selects a value x between 0.0 and 1.0 (block 334). If the randomly selected value x is less than or equal to the probability $Pr_{up}(n)$, as determined in block 336, then the terminal increases its transmit power delta by an $\Delta P_{up}$ up step (block 338), as follows:

$$\Delta P(n+1) = \Delta P(n) + \Delta P_{up}. \quad \text{Eq (13)}$$

The step sizes for $\Delta P_{up}$ and $\Delta P_{dn}$ may both be set to the same suitable value (e.g., 0.25 dB, 0.5 dB, 1.0 dB, and so on). If x is greater than $Pr_{up}(n)$ in block 336, then the terminal maintains the transmit power delta at the same level (block 330). From blocks 330 and 338, the process proceeds to block 342.

In block 342, the terminal limits the transmit power delta, $\Delta P(n+1)$, to be within the allowable range $[\Delta P_{min}, \Delta P_{max}]$. The terminal then computes the transmit power for the next time interval, $P_{dch}(n+1)$, based on the transmit power delta, $\Delta P(n+1)$, and the reference power level, $P_{ref}(n+1)$, for the next time interval, as shown in equation (1) (block 344). The terminal then limits the transmit power $P_{dch}(n+1)$ to be within the maximum power level (block 346), as follows:

$$P_{dch}(n+1) = \begin{cases} P_{dch}(n+1), & \text{if } P_{dch}(n+1) \le P_{max}, \\ P_{max}, & \text{otherwise.} \end{cases} \quad \text{Eq (14)}$$

The terminal uses the transmit power $P_{dch}(n+1)$ for the next time interval.

The probabilities $Pr_{dn}(n)$ and $Pr_{up}(n)$ may be a function of the transmit power delta, $\Delta P(n)$, and the channel gain ratio for the strongest neighbor base station, $r_{osib}(n)$. Various functions may be used for $Pr_{dn}(n)$ and $Pr_{up}(n)$. Each function may have a different impact on various power control characteristics such as (1) the convergence rate of the transmit power adjustment and (2) the distribution of transmit power deltas for the terminals in the system.

In an embodiment, the probabilities $Pr_{dn}(n)$ and $Pr_{up}(n)$ are defined as follows:

$$Pr_{up}(n) = \max(Pr_{up,min}, [1 - Pr_{\Delta P}(n)] \cdot [1 - Pr_{gain}(n)]), \quad \text{Eq (15a)}$$

and $$Pr_{dn}(n) = \max(Pr_{dn,min}, Pr_{\Delta P}(n) \cdot Pr_{gain}(n)), \quad \text{Eq (15b)}$$

where $$Pr_{\Delta P}(n) = \frac{\min(\Delta P(n), \Delta \tilde{P}_{max}) - \Delta \tilde{P}_{min}}{\Delta \tilde{P}_{max} - \Delta \tilde{P}_{min}}, \quad \text{Eq (15c)}$$

$$Pr_{gain}(n) = \frac{\min(r_{osib}(n), r_{max}) - r_{min}}{r_{max} - r_{min}}, \quad \text{Eq (15d)}$$

$Pr_{\Delta P}(n)$ is a probability related to the transmit power level;
$Pr_{gain}(n)$ is a probability related to the channel gain ratio for the strongest neighbor base station;
$\Delta \tilde{P}_{max}$, $\Delta \tilde{P}_{min}$, $r_{max}$, and $r_{min}$ are normalizing constants selected to achieve the desired power control characteristics;
$Pr_{up,min}$ is a minimum probability for upward adjustment of transmit power; and
$Pr_{dn,min}$ is a minimum probability for downward adjustment of transmit power.

For the embodiment shown by equation set (15), $Pr_{dn}(n)$ and $Pr_{up}(n)$ are joint probabilities determined by the transmit power level and the channel gain ratio for the strongest neighbor base station. The minimum probabilities $Pr_{up,min}$ and $Pr_{dn,min}$ improve steady-state characteristics and promote some movement for points in the extremes (e.g., very high or very low channel gain values). The probabilities $Pr_{dn}(n)$ and $Pr_{up}(n)$ derived as shown in equation set (15) conform to the general transmit power adjustment rules given in Table 1. The probabilities $Pr_{dn}(n)$ and $Pr_{up}(n)$ may also be derived with some other functions, and this is within the scope of the invention.

Figure 4:
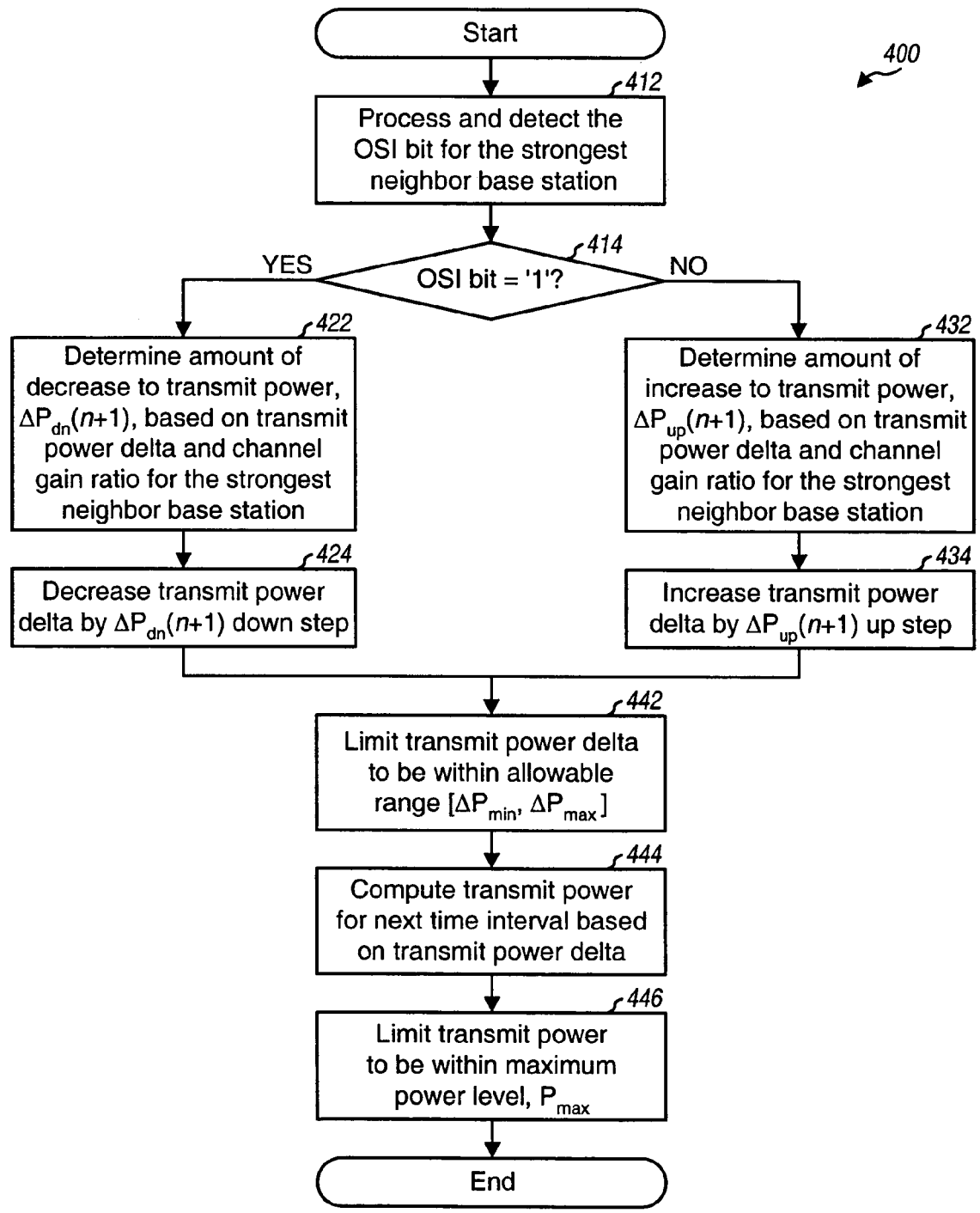
FIG. 4 shows a process for adjusting transmit power in a deterministic manner.

FIG. 4 shows a flow diagram of a process 400 for adjusting transmit power in a deterministic manner. Process 400 may also be performed by each terminal and for each time interval in which an OSI bit is transmitted. The terminal processes the OSI bit of the strongest neighbor base station (block 412) and determines whether the OSI bit is '1' or '0' (block 414). If the OSI bit is '1', then the terminal determines the amount of decrease in transmit power, $\Delta P_{dn}(n+1)$, for the next time interval (block 422). The variable down step size may be determined based on the current transmit power delta, $\Delta P(n)$, and the channel gain ratio for the strongest base station, $r_{osib}(n)$. The terminal then decreases the transmit power delta by $\Delta P_{dn}(n+1)$ (block 424). Otherwise, if the OSI bit is '0', then the terminal determines the amount of increase in transmit power, $\Delta P_{up}(n+1)$, for the next time interval, e.g., based on $\Delta P(n)$ and $r_{osib}(n)$ (block 432). The terminal then increases the transmit power delta by $\Delta P_{up}(n+1)$ (block 434). After blocks 424 and 434, the terminal limits the transmit power delta for the next time interval, $\Delta P(n+1)$, to be within the allowable range of $[\Delta P_{min}, \Delta P_{max}]$ (block 442) and further computes and limits the transmit power for the next time interval to be within the maximum power level (blocks 444 and 446).

The variable step sizes $\Delta P_{dn}(n+1)$ and $\Delta P_{up}(n+1)$ may be determined based on a predetermined function of $\Delta P(n)$ and $r_{osib}(n)$ e.g., similar to the function expressed by equation set (15). The variable step sizes may be defined to be proportional to $\Delta P(n)$ and inversely proportional to $r_{osib}(n)$. The adjustment probabilities and variable step sizes may also be determined based on a look-up table of different probabilities and step size values for different $\Delta P(n)$ and $r_{osib}(n)$ values, or by some other means.

FIGS. 3 and 4 show exemplary embodiments for adjusting transmit power in a probabilistic and a deterministic manner, respectively. For the probabilistic embodiment shown in FIG. 3, the adjustment probability is determined based on the parameters $\Delta P(n)$ and $r_{osib}(n)$, and fixed-size up and down steps are used for transmit power adjustment. For the deterministic embodiment shown in FIG. 4, the adjustment probability is fixed at 1.0, and the up and down step sizes are determined based on the parameters $\Delta P(n)$ and $r_{osib}(n)$. Various modifications may also be made to these embodiments. For example, variable up and down step sizes may also be used for the probabilistic embodiment. As another example, fixed-size up and down steps may be used for the deterministic embodiment.

The power delta $\Delta P(n)$ for the data channel may be adjusted based on the OSI bit, the channel gain, the prior power delta $\Delta P(n-1)$, the range of allowable power deltas, and the maximum power level for the terminal, as described above. In general, the power delta $\Delta P(n)$ may be adjusted based on any one or any combination of parameters. Other parameters that may be used to adjust $\Delta P(n)$ include the current transmit power $P_{dch}(n)$, a peak-to-average backoff factor $\Delta P_{bo}$, a "designated" set of base stations that may potentially observe high interference from the terminal, and so on. The peak-to-average backoff factor may be determined by the number of subbands used by the terminal for transmission, and a higher value may be used for $\Delta P_{bo}$ if more subbands are used for transmission. The transmit power for the data channel may be constrained to be less than Pmax minus this backoff factor, or $P_{dch}(n) \leq (P_{max} - \Delta P_{bo})$.

The transmit power for the terminal may also be adjusted based on OSI bits sent by multiple base stations (e.g., the serving and/or neighbor base stations). The transmit power may be adjusted in the same manner or different manners for the serving base station and a neighbor base station. The terminal may be orthogonal to other terminals communicating with the serving base station, but may nevertheless cause some interference to these other terminals if complete orthogonality is not achieved. The transmit power for the terminal may be adjusted lower if the OSI bit for the serving base station is set to '1'. The amount of transmit power adjustment due to the OSI bit from the serving base station may be determined based on computer simulation, empirical measurement, and so on, to achieve good performance.

The transmit power for the terminal may also be adjusted based on other parameters, criteria, and information. For example, the terminal may consider only OSI bits from the base stations in the designated set. The terminal may also consider or not consider a given base station for transmit power adjustment based on the channel gain and/or other parameters for that base station. The terminal may also adjust the transmit power by different amounts and/or in different manners based on all of the information available for the base station(s) to be considered for transmit power adjustment.

Figure 5:
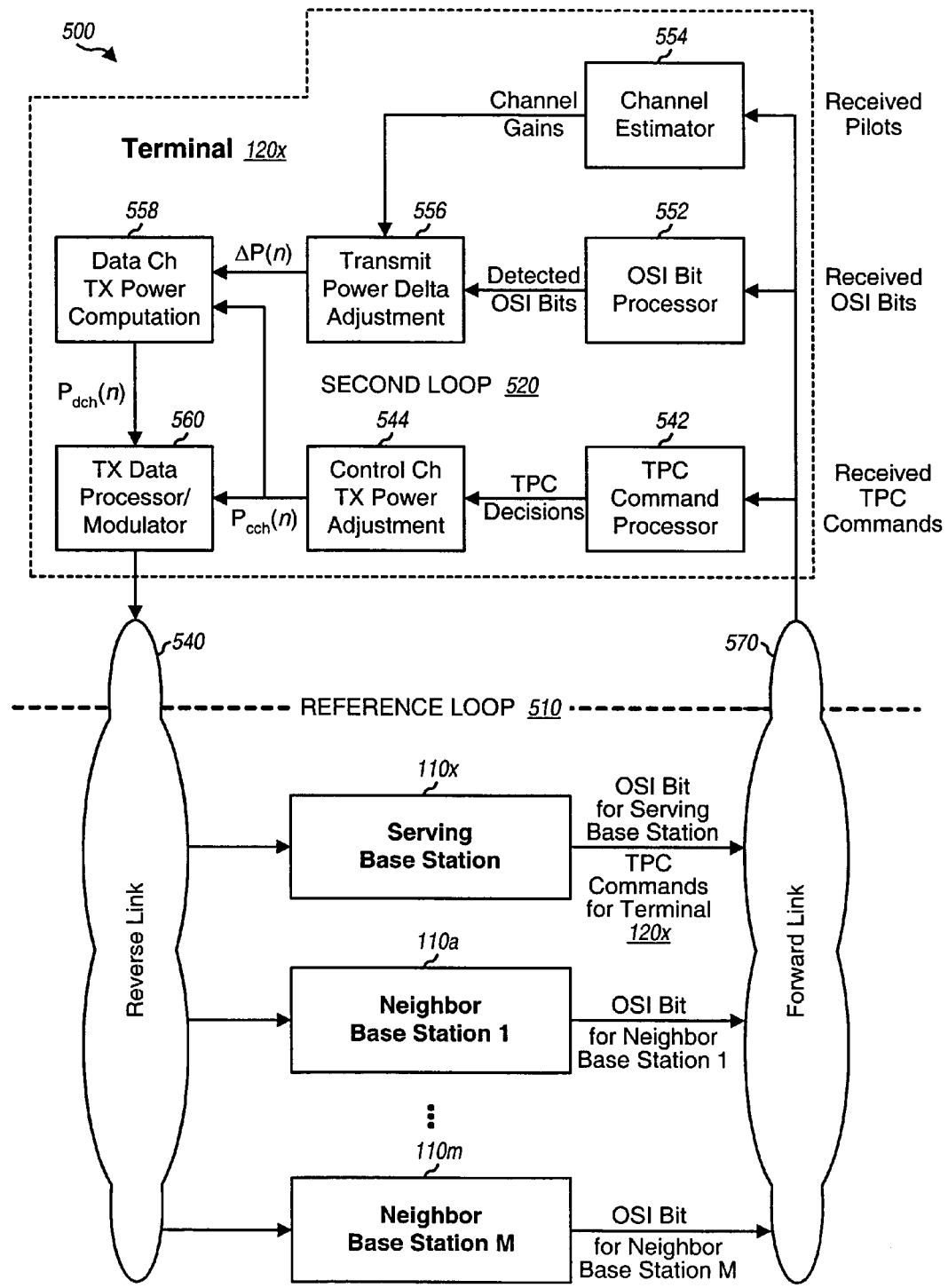
FIG. 5 shows a power control mechanism for a data channel.

FIG. 5 shows a power control mechanism 500 that may be used to adjust the transmit power for a terminal 120x in system 100. Terminal 120x communicates with a serving base station 110x and may cause interference to neighbor base stations 110a through 110m (albeit by different amounts). Power control mechanism 500 includes a reference loop 510 and a second loop 520. Reference loop 510 operates between terminal 120x and serving base station 110x. Second loop 520 operates between terminal 120x and neighbor base stations 110a through 110m and possibly serving base station 110x. For simplicity, FIG. 5 shows only the portion of loops 510 and 520 residing at terminal 120x.

Reference loop 510 adjusts the transmit power for a control channel (or some other traffic channel) and attempts to maintain the received SNR for this control channel, as measured at serving base station 110x, as close as possible to a target SNR. For reference loop 510, serving base station 110x estimates the received SNR for the control channel, compares the received SNR against the target SNR, and generates transmit power control (TPC) commands based on the comparison results, as described below. Each TPC command may be either (1) an UP command to direct an increase in transmit power for the control channel or (2) a DOWN command to direct a decrease in transmit power. Serving base station 110x transmits the TPC commands on the forward link (cloud 570) to terminal 120x.

Terminal 120x receives and processes the forward link transmission from serving base station 110x and provides "received" TPC commands to a TPC command processor 542. Each received TPC command is a noisy version of a TPC command transmitted by serving base station 110x. Processor 542 detects each received TPC command and obtains a "TPC decision", which may be (1) an UP decision if the received TPC command is deemed to be an UP command or (2) a DOWN decision if the received TPC command is deemed to be an DOWN command. A control channel transmit (TX) power adjustment unit 544 adjusts the transmit power for the control channel, $P_{cch}(n)$, based on the TPC decisions from TPC command processor 542. For example, unit 544 may increase $P_{cch}(n)$ by a $\Delta P_{cch,up}$ up step for each UP decision and decrease $P_{cch}(n)$ by a $\Delta P_{cch,dn}$ down step for each DOWN decision. A TX data processor/modulator 560 sets the transmit power for the control channel to the $P_{cch}(n)$ level indicated by unit 544. The transmission on the control channel is sent to serving base station 110x.

Due to path loss, fading, and multipath effects on the reverse link (cloud 540), which typically vary over time and especially for a mobile terminal, the received SNR for the control channel continually fluctuates. Reference loop 510 attempts to maintain the received SNR at or near the target SNR in the presence of changes in the reverse link channel condition.

Second loop 520 adjusts the transmit power for a data channel (or some other traffic channel) such that a power level that is as high as possible is used for the data channel while keeping inter-sector and intra-sector interference to within acceptable levels. For second loop 520, an OSI bit processor 552 receives and processes the OSI bits broadcast by neighbor base stations 110a through 110m and possibly serving base station 10x. OSI bit processor 552 provides detected OSI bits from the base stations to a transmit power delta adjustment unit 556. A channel estimator 554 receives pilots from the serving and neighbor base stations, estimates the channel gain for each base station, and provide the estimated channel gains for all base stations to unit 556. Unit 556 determines the channel gain ratios for the neighbor base stations and identifies the strongest neighbor base station. Unit 556 further adjusts the transmit power delta $\Delta P(n)$ for the data channel based on the detected OSI bit and the channel gain ratio for the strongest neighbor, as described above. Unit 556 may implement process 300 or 400 and may adjust $\Delta P(n)$ in a probabilistic or deterministic manner. In general, unit 556 may adjust the transmit power delta $\Delta P(n)$ based on detected OSI bits and/or other pertinent information for any number of base stations, which may include the serving and/or neighbor base stations.

A data channel transmit power computation unit 558 receives the control channel transmit power, $P_{cch}(n)$, which is used as the reference power level, $P_{ref}(n)$, and the transmit power delta, $\Delta P(n)$. Unit 558 computes the transmit power $P_{dch}(n)$ for the data channel based on $P_{cch}(n)$ and $\Delta P(n)$ Unit 560 sets the transmit power for the data channel to the $P_{dch}(n)$ level indicated by unit 558. The transmission on the data channel is sent to serving base station 110x. The transmissions on the data and control channels may cause interference to neighbor base stations 110a through 110m.

Each base station 110 receives transmissions from terminals on the reverse link, estimates the interference observed by that base station, compares the measured interference against the nominal interference threshold, sets the OSI bit accordingly based on the comparison result, and broadcasts the OSI bit on the forward link.

Reference loop 510 and second loop 520 may operate concurrently but may be updated at different rates, with loop 510 being a faster loop than loop 520. The update rates for the two loops may be selected to achieve the desired power control performance. As an example, reference loop 510 may be updated at a rate of, e.g., 150 times per second, and second loop may be updated at a rate of, e.g., 10 to 20 times per second. Reference loop 510 and second loop 520 may operate on transmissions sent on the control channel and the data channel, respectively. The control and data channels may be assigned different subbands in each hop period, as shown in FIG. 2. In this case, reference loop 510 and second loop 520 may operate simultaneously on transmissions sent on different subbands. The control channel may also be multiplexed with the data channel (e.g., using TDM and/or CDM) and sent on the same subbands.

Figure 6:
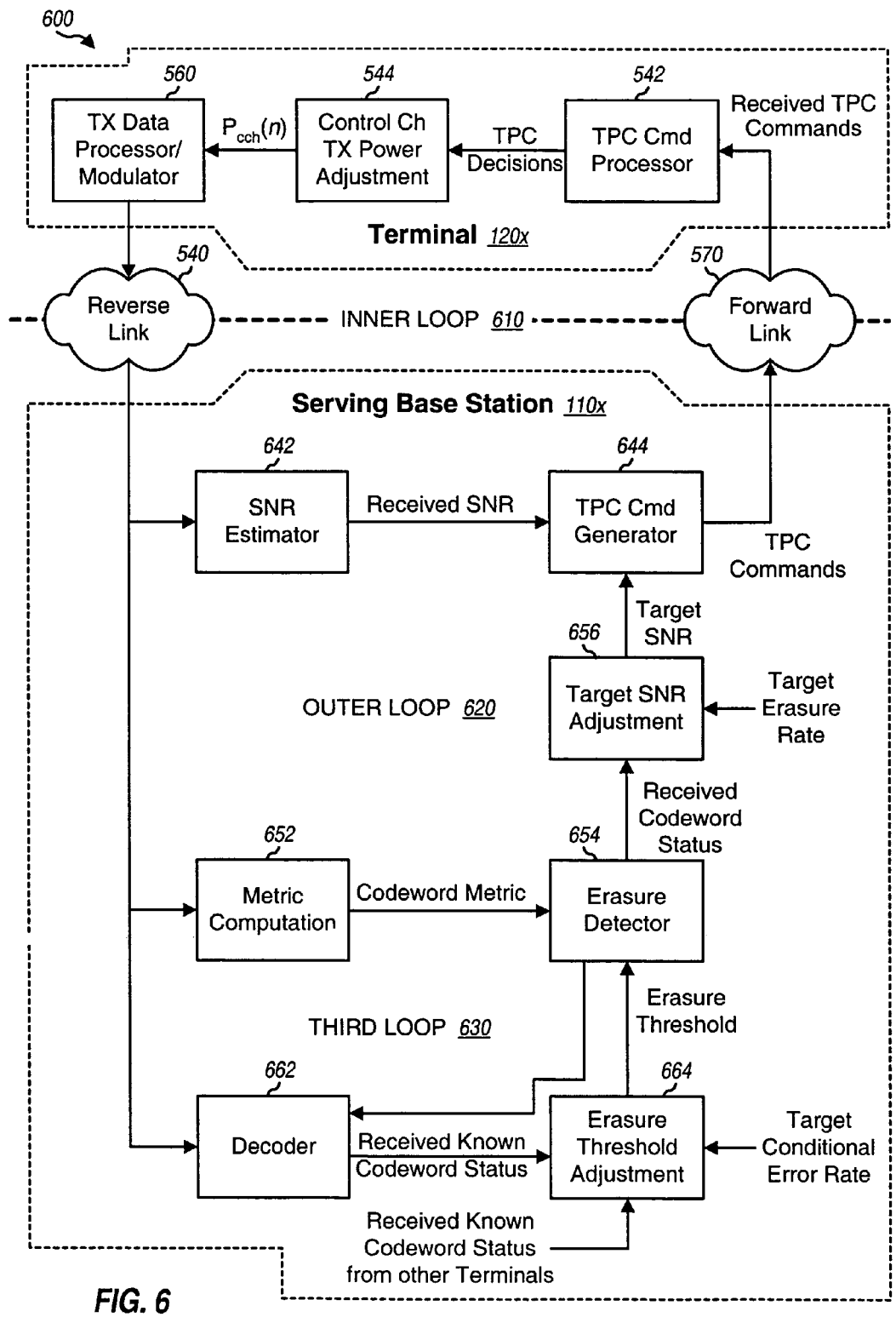
FIG. 6 shows a power control mechanism for a control channel.

FIG. 6 shows a power control mechanism 600 that may be used for the control channel. Power control mechanism 600 (which may be used for reference loop 510 in FIG. 5) includes an inner loop 610, an outer loop 620, and a third loop 630. Inner loop 610 attempts to maintain the received SNR for the control channel as close as possible to the target SNR. For inner loop 610, an SNR estimator 642 at serving base station 110x estimates the received SNR for the control channel and provides the received SNR to a TPC command generator 644. Generator 644 compares the received SNR against the target SNR and generates TPC commands based on the comparison results. Serving base station 110x transmits the TPC commands on the forward link (cloud 570) to terminal 120x. Terminal 120x receives and processes the TPC commands from serving base station 110x and adjusts the transmit power for the control channel, as described above for FIG. 5.

Data may be sent in blocks on the control channel, and each data block may be coded with a block code to obtain a corresponding codeword (or coded data block). An error detection code may not be used for the control channel. In this case, the serving base station may perform erasure detection for each received codeword to determine whether the codeword is erased or non-erased. An erased codeword may be deemed to be unreliable and processed accordingly (e.g., discarded). The erasure detection may be performed by computing a metric for each received codeword, comparing the computed metric against an erasure threshold, and declaring the received codeword to be erased or non-erased based on the comparison result.

Outer loop 620 adjusts the target SNR such that a target erasure rate, $\text{Pr}_{erasure}$, is achieved for the control channel. The target erasure rate indicates a desired probability (e.g., 10%) of declaring a received codeword as erased. A metric computation unit 652 computes the metric for each received codeword. An erasure detector 654 performs erasure detection for each received codeword based on its computed metric and the erasure threshold and provides the status of the received codeword (erased or non-erased) to a target SNR adjustment unit 656. Unit 656 then adjusts the target SNR for the control channel as follows:

$$SNR_{target}(k+1) = \begin{cases} SNR_{target}(k) + \Delta SNR_{up}, & \text{for an erased codeword} \\ SNR_{target}(k) + \Delta SNR_{dn}, & \text{for an non-erased codeword,} \end{cases} \quad \text{Eq (16)}$$

where $SNR_{target}(k)$ is the target SNR for outer loop update interval k;
$\Delta SNR_{up}$ is an up step size for the target SNR; and
$\Delta SNR_{dn}$ is a down step size for the target SNR.
The $\Delta SNR_{up}$ and $\Delta SNR_{dn}$ step sizes may be set based on the following:

$$\Delta SNR_{up} = \Delta SNR_{dn} \cdot \left( \frac{1 - Pr_{erasure}}{Pr_{erasure}} \right). \quad \text{Eq (17)}$$

Third loop 630 adjusts the erasure threshold such that a target conditional error rate, $\text{Pr}_{error}$, is achieved for the control channel. The target conditional error rate indicates a desired probability of a received codeword being decoded in error when deemed to be non-erased. A small $\text{Pr}_{error}$ (e.g., 1%) corresponds to high confidence in the decoding results for non-erased codewords. Terminal 110x and/or other terminals in communication with serving base station 110x may transmit known codewords on the control channel periodically or when triggered. Units 652 and 654 perform erasure detection for each received known codeword in the same manner as for a received codeword. For each received known codeword deemed to be non-erased, a decoder 662 decodes the received known codeword and determines whether the decoded data block is correct or in error. Decoder 662 provides the status of each received known codeword, which may be erased, "good", or "bad". A good codeword is a received known codeword deemed to be non-erased and decoded correctly. A bad codeword is a received known codeword deemed to be non-erased but decoded in error. An erasure threshold adjustment unit 664 adjusts the erasure threshold based on the status of each received known codeword, as follows:

$$TH_{erasure}(\ell+1) = \begin{cases} TH_{erasure}(\ell) + \Delta TH_{up}, & \text{for a good codeword,} \\ TH_{erasure}(\ell) - \Delta TH_{dn}, & \text{for a bad codeword and} \\ TH_{erasure}(\ell), & \text{for an erased codeword} \end{cases} \quad \text{Eq (18)}$$

where $TH_{erasure}(l)$ is the erasure threshold for third loop update interval l;
$\Delta TH_{up}$ is an up step size for the erasure threshold; and
$\Delta TH_{dn}$ is a down step size for the erasure threshold.

Equation (18) assumes that a lower erasure threshold increases the likelihood of a received codeword being declared erased.

The $\Delta TH_{up}$ and $\Delta TH_{dn}$ step sizes may be set based on the following:

$$\Delta TH_{dn} = \Delta TH_{up} \cdot \left( \frac{1 - Pr_{error}}{Pr_{error}} \right). \quad \text{Eq (19)}$$

Inner loop 610, outer loop 620, and third loop 630 are typically updated at different rates. Inner loop 610 is the fastest loop of the three loops, and the transmit power for the control channel may be updated at a particular rate (e.g., 150 times per second). Outer loop 620 is the next fastest loop, and the target SNR may be updated whenever a codeword is received on the control channel. Third loop 630 is the slowest loop, and the erasure threshold may be updated whenever a known codeword is received on the control channel. The update rates for the three loops may be selected to achieve the desired performance for erasure detection and power control for the control channel. Power control mechanism 600 is further described in commonly assigned U.S. patent application Ser. No. 10/890,717, entitled "Robust Erasure Detection and Erasure-Rate-Based Closed Loop Power Control," filed Jul. 13, 2004.

For clarity, specific embodiments have been described above for various aspects of power control. Numerous other embodiments may also be derived based on the description provided herein. Some examples are given below.

The same range of allowable transmit power deltas, [$\Delta P_{min}$, $\Delta P_{max}$], may be used for all terminals in the system. Different ranges of [$\Delta P_{min}$, $\Delta P_{max}$] may also be used for different terminals, e.g., depending on their locations. For example, terminals with smaller channel gain ratio for the strongest neighbor base stations may use a smaller range of transmit power deltas (e.g., the same $\Delta P_{min}$ but a smaller $\Delta P_{max}$ than terminals located closer to the serving base stations.

The reference power level, $P_{ref}(n)$, used to derive the data channel transmit power, $P_{dcb}(n)$, may be set to the transmit power for another power-controlled channel, as described above. The reference power level may also be obtained in other manners, e.g., estimated based on the channel gain for the serving base station. The data channel transmit power may also be adjusted directly, instead of via the transmit power delta. The serving base station may provide feedback to inform the terminal whether the data channel transmit power is within an allowable range.

A terminal may only respond to the OSI bit of the strongest neighbor base station, as described above. A terminal may also adjust its transmit power based on OSI bits of multiple neighbor base stations. For example, a terminal may perform process 300 or 400 for S strongest neighbor base stations, one base station at a time, where S>1. The channel gain ratio for each neighbor base station may be taken into account in either the adjustment probabilities (for process 300) or the variable step sizes (for process 400).

A single OSI bit may be used to indicate the interference observed by each base station, as described above. Multiple bits may also be used to report interference. This may allow the terminals to more quickly and/or effectively adjust their transmit powers. This may, in turn, improve overall system stability and performance. For example, each base station may report information on "how far" the measured interference is from the nominal interference threshold. As another example, each base station may broadcast an additional bit (a distress/panic bit) that may be set to '1' when the interference level exceeds a high interference threshold. This high threshold may be significantly higher (e.g., 2 to 3 standard deviations higher) than the nominal threshold. A rapidly rising or an unusually high interference level is often a sign of the system becoming unstable. Upon observing the panic bit set, each terminal may simply set its transmit power delta to the minimum value, $\Delta P_{min}$, and may remain at this transmit power level until the panic bit is reset to '0'. In conjunction with the power control for the control channel, this mechanism may be effective in ensuring system stability.

Each base station may broadcast its interference information to all terminals, if the interference observed by the base station is randomized, e.g., with frequency hopping. If the base stations have more specific interference information, then the transmit powers of the terminals may be adjusted in a manner to take advantage of this information. For example, each terminal may be assigned one or more specific subbands for data transmission (without frequency hopping). A base station may then observe different amounts of interference on different subbands. Terminals causing large amounts of interference may be specifically identified based on their assigned subbands, and the transmit powers of these terminals may be reduced accordingly.

The supported data rate for each terminal is determined by the received SNR for the data channel. This received SNR, for the embodiments described above, is dependent on (1) the target SNR associated with the reference power level and (2) the transmit power delta, $\Delta P(n)$, used by the terminal. The transmit power delta may be autonomously adjusted by the terminal without any input from the serving base station, as described above. The terminal may send the transmit power delta, the received SNR for the data channel, the supported data rate for the data channel, or equivalent information to the serving base station. The terminal may also send the maximum number of subbands, $N_{sb,max}(n)$, that the terminal can support at the current transmit power delta, the desired quality of service (QoS), the buffer size, and so on. To reduce the amount of signaling, the terminal may send $\Delta P(n)$ and $N_{sb,max}(n)$ every few update intervals, via in-band signaling on the data channel, and so on.

A scheduler at/for the serving base station may use all of the information reported by the terminal to allocate resources to the terminal and to schedule the terminal for data transmission on the reverse link. The scheduler may allocate $N_{sb,max}(n)$ subbands, less than $N_{sb,max}(n)$ subbands, or more than $N_{sb,max}(n)$ subbands to the terminal. If the scheduler allocates more than $N_{sb,max}(n)$ subbands, then the terminal can scale down the transmit power delta accordingly. For example, if $2N_{sb,max}(n)$ subbands are allocated, then $\Delta P(n)$ may be scaled down by a factor of two.

The power control may be performed by each terminal based on various pieces of information the terminal obtains from its serving base station and neighbor base stations, as described above. The power control may also be performed by each base station for all terminals in communication with the base station. For example, each base station may obtain an interference report (e.g., the OSI bit) for each neighbor base station, e.g., via signaling between the base stations or transmissions from the terminals. Each base station may also obtain the channel gains determined by each terminal for the serving and neighbor base stations. Each base station may then compute the transmit power delta for each terminal based on the interference reports and the channel gains applicable for that terminal and may sent the transmit power delta to the terminal. Each terminal may then adjust its transmit power using the transmit power delta received from its serving base station. Alternatively, each base station may compute and send the transmit power for each terminal. The availability of the transmit power deltas for all terminals in communication with each base station can expedite the scheduling for the terminals.

The power control techniques described herein may be used for various types of wireless communication systems. These techniques are especially suited for systems with small intra-sector interference, e.g., OFDMA, TDMA and FDMA systems.

The techniques described herein may be used for power control of various types of traffic channels (e.g., data and control channels). These techniques are also well suited for a hybrid automatic retransmission (H-ARQ) scheme. With H-ARQ, each coded packet is partitioned into multiple (Nbl) subblocks, and one subblock is transmitted at a time for the coded packet. As each subblock for a given coded packet is received via the reverse link, the serving base station attempts to decode and recover the packet based on all subblocks received thus far for the packet. The serving base station is able to recover the packet based on a partial transmission because the subblocks contain redundant information that is useful for decoding when the received SNR is low but may not be needed when the received SNR is high. The serving base station transmits an acknowledgment (ACK) if the packet is decoded correctly, and the terminal may terminate the transmission of the packet early upon receiving the ACK.

With H-ARQ, each coded packet may be transmitted in a variable amount of time until decoded correctly. A conventional power control mechanism that adjusts the received SNR for the data channel based on packet error rate (PER) would reduce the transmit power for the data channel to a low level such that a target PER is achieved with all Nbl subblocks transmitted for each coded packet. This may severely reduce system throughput. The techniques described herein allow a high transmit power level to be used even with variable duration transmission supported by H-ARQ.

Figure 7:
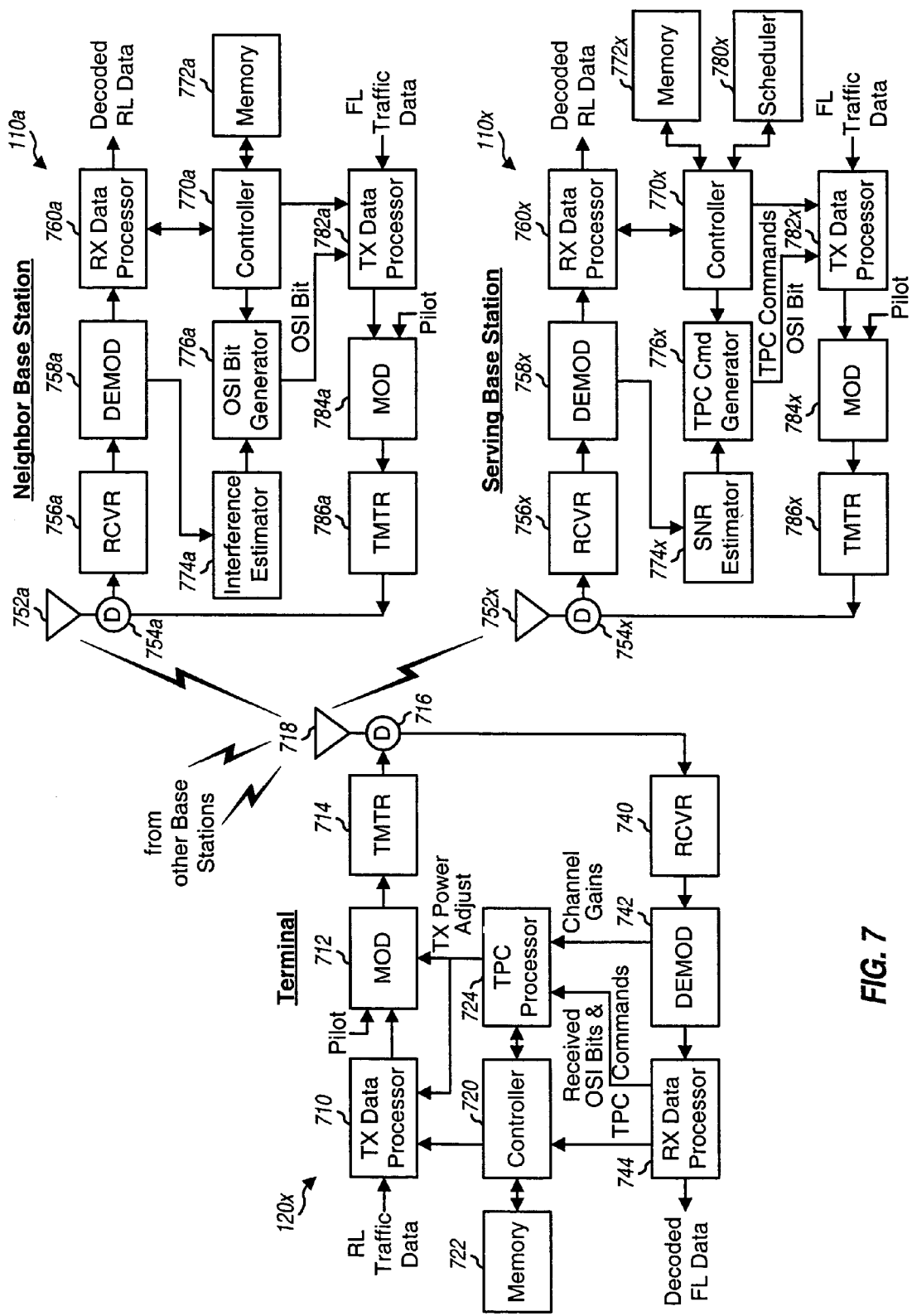
FIG. 7 shows a terminal, a serving base station, and a neighbor base station.

FIG. 7 shows a block diagram of an embodiment of terminal 120x, serving base station 110x, and neighbor base station 110a. On the reverse link, at terminal 120x, a TX data processor 710 processes (e.g., codes, interleaves, and modulates) reverse link (RL) traffic data and provides modulation symbols for the traffic data. TX data processor 710 also processes control data (e.g., a channel quality indicator) from a controller 720 and provides modulation symbols for the control data. A modulator (MOD) 712 processes the modulation symbols for the traffic and control data and pilot symbols and provides a sequence of complex-valued chips. The processing by TX data processor 710 and modulator 712 is dependent on the system. Modulator 712 performs OFDM modulation if the system utilizes OFDM. A transmitter unit (TMTR) 714 conditions (e.g., converts to analog, amplifies, filters, and frequency upconverts) the sequence of chips and generates a reverse link signal, which is routed through a duplexer (D) 716 and transmitted via an antenna 718.

At serving base station 110x, the reverse link signal from terminal 120x is received by an antenna 752x, routed through a duplexer 754x, and provided to a receiver unit (RCVR) 756x. Receiver unit 756x conditions (e.g., filters, amplifies, and frequency downconverts) the received signal and further digitizes the conditioned signal to obtain a stream of data samples. A demodulator (DEMOD) 758x processes the data samples to obtain symbol estimates. A receive (RX) data processor 760x then processes (e.g., deinterleaves and decodes) the symbol estimates to obtain decoded data for terminal 120x. RX data processor 760x also performs erasure detection and provides to a controller 770x the status of each received codeword used for power control. The processing by demodulator 758x and RX data processor 760x is complementary to the processing performed by modulator 712 and TX data processor 710, respectively.

The processing for a forward link transmission may be performed similarly to that described above for the reverse link. The processing for the transmissions on the forward and reverse links is typically specified by the system.

For reverse link power control, at serving base station 110x, an SNR estimator 774x estimates the received SNR for terminal 120x and provides the received SNR to a TPC command (cmd) generator 776x. Generator 776x also receives the target SNR and generates TPC commands for terminal 120x. The TPC commands are processed by a TX data processor 782x and a modulator 784x, conditioned by a transmitter unit 786x, routed through duplexer 754x, and transmitted via antenna 752x to terminal 120x. At neighbor base station 110a, an interference estimator 774a estimates the interference observed by the base station and provides the measured interference to an OSI bit generator 776a. Generator 776a also receives the nominal interference threshold and generates the OSI bit for base station 110a. The OSI bit is processed and broadcast to terminals in the system. Generator 776a may also generate a panic bit or some other type of interference report.

At terminal 120x, the forward link signals from the serving and neighbor base stations are received by antenna 718. The received signal is routed through duplexer 716, conditioned and digitized by a receiver unit 740, and processed by a demodulator 742 and an RX data processor 744 to obtain received TPC commands and received OSI bits. A channel estimator within demodulator 742 estimates the channel gain for each base station. A TPC processor 724 detects the received TPC commands to obtain TPC decisions, which are used to update the transmit power for the control channel. TPC processor 724 also adjusts the transmit power for the data channel based on the received OSI bits for neighbor base stations, the channel gains for the serving and neighbor base stations, and the transmit powers for the data and control channels, as described above. TPC processor 724 (or controller 720) may implement process 300 in FIG. 3 or process 400 in FIG. 4. TPC processor 724 provides transmit power adjustment controls for the control and data channels. Processor 710 and/or modulator 712 receive the controls from TPC processor 724 and adjust the transmit powers for control and data channels.

Controllers 720, 770x, and 770a direct the operations of various processing units within terminal 120x and base station 110x and 110a, respectively. These controllers may also perform various functions for power control for the reverse link. For example, controllers 720 and 770x may implement the processing units shown in FIGS. 5 and 6 for terminal 120x and base station 110x, respectively. Memory units 722, 772x, and 772a store data and program codes for controllers 720, 770x, and 770a, respectively. A scheduler 780x schedules terminals for data transmission to/from serving base station 110x.

The power control techniques described herein may be implemented by various means. For example, these techniques may be implemented in hardware, software, or a combination thereof. For a hardware implementation, the processing units used to perform power control may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the power control techniques may be implemented with modules (e.g., procedures, functions, and so on) that perform the functions described herein. The software codes may be stored in a memory unit (e.g., memory unit 722 in FIG. 7) and executed by a processor (e.g., controller 720). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of performing power control for a wireless terminal in a wireless communication system, comprising:
    obtaining, for each of at least one base station, an indication of interference observed by the base station, each of the at least one base station being a neighbor base station not designated to receive a data transmission sent by the wireless terminal or a serving base station designated to receive the data transmission sent by the wireless terminal;
    adjusting transmit power for the data transmission based on at least one indication of interference obtained for the at least one base station;
    estimating a channel gain for a serving base station included in the at least one base station; and
    for each neighbor base station to be considered in adjusting the transmit power,
        estimating a channel gain for the neighbor base station; and
        adjusting the transmit power for the data transmission based on an indication of interference obtained for the neighbor base station and the estimated channel gains for the neighbor and serving base stations.

2. The method of claim 1, further comprising:
    limiting the transmit power for the data transmission to be within a range determined based on a measurement obtained for the data transmission.

3. The method of claim 1, further comprising:
    estimating a received signal quality (SNR) for the data transmission at the serving base station; and
    limiting the transmit power for the data transmission based on the estimated received SNR for the data transmission.

4. The method of claim 1, wherein the obtaining the indication of interference observed by the base station comprises receiving a first bit that indicates whether the interference observed by the base station is above or below a first interference threshold.

5. The method of claim 4, wherein the obtaining the indication of interference observed by the base station further comprises receiving a second bit that indicates whether the interference observed by the base station exceeds a second interference threshold that is higher than the first interference threshold.

6. The method of claim 1, further comprising obtaining a plurality of indications of interference for a plurality of neighbor base stations, and adjusting the transmit power for the data transmission based on an indication of interference obtained for a single neighbor base station that is selected from among the plurality of neighbor base stations.

7. The method of claim 6, further comprising selecting as the single neighbor base station a neighbor base station with a smallest path loss to the wireless terminal among the plurality of neighbor base stations.

8. The method of claim 1, further comprising considering only indications of interference for base stations in a designated set of base stations for adjustment of the transmit power for the data transmission.

9. The method of claim 1, wherein the adjusting transmit power for the data transmission comprises
for each base station to be considered in adjusting the transmit power, adjusting the transmit power for the data transmission based on the indication of interference obtained for the base station, a channel gain for the base station, a current transmit power level for the data transmission, a range of allowable transmit power deltas, a maximum transmit power for the terminal, a peak-to-average backoff factor, or a combination thereof.

10. The method of claim 1, wherein the adjusting transmit power for the data transmission comprises
for each base station to be considered in adjusting the transmit power,
decreasing the transmit power if the interference observed by the base station is above a first interference threshold, and
increasing the transmit power if the interference observed by the base station is below the first interference threshold.

11. The method of claim 10, wherein the adjusting transmit power for the data transmission further comprises
for each base station to be considered in adjusting the transmit power,
setting the transmit power to a predetermined low power level if the interference observed by the base station is above a second interference threshold that, is higher than the first interference threshold.

12. The method of claim 1, further comprising estimating the channel gains for the neighbor and serving base stations based on pilots received from the neighbor and serving base stations, respectively.

13. The method of claim 1, further comprising:
for each neighbor base station to be considered in adjusting the transmit power,
determining a probability for adjusting the transmit power upward or downward based on the channel gains for the neighbor and serving base stations, and
adjusting the transmit power for the data transmission based on the indication of interference obtained for the neighbor base station and the probability determined for the neighbor base station.

14. The method of claim 13, further comprising determining the probability further based on a current level of the transmit power for the data transmission.

15. The method of claim 14, further comprising adjusting the transmit power in a fixed-size step and in accordance with the determined probability.

16. The method of claim 1, further comprising:
for each neighbor base station to be considered in adjusting the transmit power,
determining a step size for adjusting the transmit power based on the estimated channel gains for the neighbor and serving base stations, and
adjusting the transmit power for the data transmission based on the indication of interference obtained for the neighbor base station and the step size determined for the neighbor base station.

17. The method of claim 16, further comprising determining the step size further based on a current level of the transmit power for the data transmission.

18. The method of claim 3, further comprising determining the transmit power for the data transmission based on a reference power level and a transmit power delta, and adjusting the transmit power delta is based on the at least one indication of interference obtained for the at least one base station.

19. The method of claim 18, further comprising:
adjusting the reference power level such that a received SNR for a second transmission sent by the wireless terminal to the serving base station is maintained at a target SNR, and wherein the received SNR for the data transmission is estimated based on the target SNR for the second transmission.

20. The method of claim 19, wherein the second transmission is for a control channel sent by the terminal to the serving base station.

21. The method of claim 3, further comprising limiting the transmit power for the data transmission such that the received SNR for the data transmission is within a range of received SNRs allowable for the data transmission.

22. The method of claim 3, further comprising:
limiting the transmit power for the data transmission to be at or below a maximum power level allowable for the wireless terminal.

23. The method of claim 1, wherein the obtaining the indication of interference observed by the base station and the adjusting the transmit power for the data transmission are performed by the wireless terminal.

24. The method of claim 1, wherein the obtaining the indication of interference observed by the base station and the adjusting the transmit power for the data transmission are performed by the serving base station.

25. The method of claim 24, further comprising obtaining the at least one indication of interference via signaling exchanged among the at least one base station.

26. The method of claim 24, further comprising:
obtaining an estimate of a channel gain between the wireless terminal and the serving base station;
for each neighbor base station to be considered in adjusting the transmit power,
obtaining an estimate of a channel gain between the wireless terminal and the neighbor base station, and
adjusting the transmit power for the data transmission based on the indication of interference obtained for the neighbor base station and the estimated channel gains for the neighbor and serving base stations.

27. The method of claim 1, further comprising sending the data transmission using hybrid automatic retransmission (H-ARQ) that allows for early termination of a transmission of a packet decoded correctly by a base station designated to receive the data transmission.

28. The method of claim 1, wherein the wireless communication system is an orthogonal frequency division multiple access (OFDMA) system.

29. The method of claim 1, wherein the wireless communication system is a Time Division Multiple Access (TDMA) system.

30. The method of claim 1, wherein the wireless communication system is a Frequency Division Multiple Access (FDMA) system.

31. An apparatus operable to perform power control for a wireless terminal in a wireless communication system, comprising:

a processor operative to obtain, for each of at least one base station, an indication of interference observed by the base station, each of the at least one base station being a neighbor base station not designated to receive a data transmission sent from the wireless terminal or a serving base station designated to receive the data transmission sent from the wireless terminal;

an estimation unit operative to estimate a channel gain for a serving base station included in the at least one base station and for each neighbor base station included in the at least one base station; and an adjustment unit operative to adjust transmit power for the data transmission based on an indication of interference obtained for the at least one base station, an indication of interference obtained for each neighbor base station included in the at least one base station, and the estimated channel gains for the neighbor and serving base stations.

32. The apparatus of claim 31, further comprising:

a computation unit operative to estimate a received signal quality (SNR) for the data transmission at a serving base station and to limit the transmit power for the data transmission based on the estimated received SNR for the data transmission.

33. The apparatus of claim 31, wherein the adjustment unit is operative to, for each base station to be considered in adjusting the transmit power, adjust the transmit power for the data transmission based on an indication of interference obtained for the base station, a channel gain for the base station, a current level of the transmit power for the data transmission, or a combination thereof.

34. An apparatus operable to perform power control for a wireless terminal in a wireless communication system, comprising:

means for obtaining, for each of at least one base station, an indication of interference observed by the base station, each of the at least one base station being a neighbor base station not designated to receive a data transmission sent by the wireless terminal or a serving base station designated to receive the data transmission sent by the wireless terminal;

means for estimating a channel gain for a serving base station included in the at least one base station and for each neighbor base station included in the at least one base station; and means for adjusting transmit power for the data transmission based on an indication of interference obtained for the at least one base station, an indication of interference obtained for a neighbor base station included in the at least one base station, and the estimated channel gains.

35. The apparatus of claim 34, further comprising:

means for estimating a received signal quality (SNR) for the data transmission at a serving base station designated to receive the data transmission; and means for limiting the transmit power for the data transmission based on the estimated received SNR for the data transmission.

36. The apparatus of claim 34, further comprising means for adjusting the transmit power for the data transmission based on an indication of interference obtained for the base station, a channel gain for the base station, a channel gain for the serving base station designated to receive the data transmission, a current level of the transmit power, or a combination thereof.

37. The method of claim 1, wherein estimating the channel gain for the base station comprises processing a pilot received from the base station via the forward link, estimating the received pilot strength, and filtering pilot strength estimates over time.

38. A non-transitory computer-readable medium having stored thereon computer-executable instructions for:

obtaining, for respective one or more base stations, an indication of interference observed by the respective one or more base stations, the respective one or more base stations being a neighbor base station not designated to receive a data transmission sent from a wireless terminal or a serving base station designated to receive the data transmission sent from the wireless terminal;

estimating a channel gain for a serving base station included in the one or more base stations and for respective neighbor base stations included in the one or more base stations; and adjusting transmit power for the data transmission based on an indication of interference obtained for the respective one or more base stations, an indication of interference obtained for the respective neighbor base stations included in the one or more base stations, and the estimated channel gains for the respective neighbor base stations and the serving base station.

39. The computer-readable medium of claim 38, the computer-executable instructions further for:

estimating a received signal quality (SNR) for the data transmission at a serving base station included in the one or more base stations; and limiting the transmit power for the data transmission based on the estimated received SNR for the data transmission.

40. The computer-readable medium of claim 38, the computer-executable instructions further for receiving a first bit that indicates whether the indication of interference observed by the respective one or more base stations is above or below a first interference threshold.

41. The computer-readable medium of claim 38, the computer-executable instructions further for:

obtaining a plurality of indications of interference for a plurality of neighbor base stations, and adjusting the transmit power for the data transmission based on an indication of interference obtained for a single neighbor base station that is selected from among the plurality of neighbor base stations.

42. The computer-readable medium of claim 41, the computer-executable instructions further for:

selecting as the single neighbor base station a neighbor base station with a smallest path loss to the wireless terminal among the plurality of neighbor base stations.

43. The computer-readable medium of claim 38, the computer-executable instructions further for:

decreasing the transmit power if the indication of interference observed by a given base station of the one or more base stations is above a first interference threshold, and increasing the transmit power if the indication of interference observed by the given base station is below the first interference threshold.

44. The computer-readable medium of claim 43, the computer-executable instructions further for:

setting the transmit power to a predetermined low power level if the indication of interference observed by the given base station is above a second interference threshold that is higher than the first interference threshold.

45. The computer-readable medium of claim 38, the computer-executable instructions further for:

determining a step size for adjusting the transmit power based on the estimated channel gains for the respective neighbor base stations and the serving base station, and adjusting the transmit power for the data transmission based on the indication of interference obtained for the respective neighbor base stations and the step size determined for the respective neighbor base stations.

46. The computer-readable medium of claim 38, the computer-executable instructions further for:
sending the data transmission using hybrid automatic retransmission (H-ARQ) that allows for early termination of a transmission of a packet decoded correctly by a base station designated to receive the data transmission.

47. The method of claim 1, wherein estimating the channel gain for the serving base station further comprises:
filtering forward link transmissions over time to produce a value indicative of channel gain between the base station and the terminal.

* * * * *